US006316548B1

(12) United States Patent
Koyanagi et al.

(10) Patent No.: US 6,316,548 B1
(45) Date of Patent: Nov. 13, 2001

(54) (METH)ACRYLIC PREMIX, (METH) ACRYLIC SMC OR BMC, AND PROCESS PRODUCING (METH)ACRYLIC ARTIFICIAL MARBLE

(75) Inventors: Seiya Koyanagi; Katsumi Yonekura; Shinji Saiki; Kentaro Hayashi; Yuichiro Kishimoto, all of Aichi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/418,362

(22) Filed: Oct. 14, 1999

Related U.S. Application Data

(63) Continuation of application No. PCT/JP98/01676, filed on Apr. 13, 1998.

(30) Foreign Application Priority Data

| Apr. 14, 1997 | (JP) | 9-095714 |
| May 8, 1997 | (JP) | 9-118297 |
| Jun. 17, 1997 | (JP) | 9-160074 |
| Jun. 17, 1997 | (JP) | 9-160075 |
| Sep. 9, 1997 | (JP) | 9-244132 |
| Sep. 25, 1997 | (JP) | 9-259929 |
| Sep. 25, 1997 | (JP) | 9-259930 |
| Sep. 25, 1997 | (JP) | 9-259931 |

(51) Int. Cl.[7] .............. C08L 33/06; C08F 4/36
(52) U.S. Cl. .......... 525/221; 525/227; 525/265; 525/273; 525/302; 525/309; 525/902; 526/230.5; 526/332.3; 526/232.3; 526/232.5
(58) Field of Search .................. 525/265, 273, 525/221, 302, 309, 902, 439; 526/230.5, 332.3, 232.3, 232.5

(56) References Cited

U.S. PATENT DOCUMENTS

| 5,126,396 | * | 6/1992 | Orton et al. ........................ 525/28 |
| 5,149,776 | | 9/1992 | Kushi et al. . | |
| 5,183,870 | * | 2/1993 | Fukushima et al. .............. 526/318 |
| 5,356,754 | | 10/1994 | Kushi et al. . | |
| 5,747,553 | * | 5/1998 | Guzauskas ...................... 523/115 |
| 5,763,528 | * | 6/1998 | Barsotti et al. .................... 525/123 |

FOREIGN PATENT DOCUMENTS

| 975 587 | 11/1964 | (GB) . |
| 59-91109 | 5/1984 | (JP) . |
| 60-202128 | 10/1985 | (JP) . |
| 61-171713 | 8/1986 | (JP) . |
| 63-30511 | 2/1988 | (JP) . |
| 63-182315 | 7/1988 | (JP) . |
| 2-305842 | 12/1990 | (JP) . |
| 3-152106 | 6/1991 | (JP) . |
| 4-81448 | 3/1992 | (JP) . |
| 6-219800 | 8/1994 | (JP) . |
| 6-313019 | 11/1994 | (JP) . |
| 7-70236 | 3/1995 | (JP) . |
| 7-188505 | 7/1995 | (JP) . |
| 8-133807 | 5/1996 | (JP) . |
| 8-225705 | 9/1996 | (JP) . |
| 9-12823 | 1/1997 | (JP) . |

* cited by examiner

Primary Examiner—James J. Seidleck
Assistant Examiner—Olga Asinovsky
(74) Attorney, Agent, or Firm—Oblon, Spivak, McClelland, Maier & Neustadt, P.C.

(57) ABSTRACT

A (meth)acrylic premix comprising a (meth)acrylic resin composition (A) containing a (meth)acrylic monomer (a) and a (meth)acrylic polymer (b), an inorganic filler (B), and a curing agent (C), wherein, the component (a) is a (meth) acrylate having a bicyclo ring, fluorine atom, cyclic ether, cyclohexane ring or tricyclo ring, and the component (C) is a radical polymerization initiator having a 10 hours half-life temperature of 75° C. or more; an acrylic SMC or BMC comprising this (meth)acrylic premix and a thickening agent; and a method for producing (meth)acrylic artificial marble, wherein this (meth)acrylic SMC or BMC is cured with being pressurized and heated at a temperature in the range from 105 to 150° C., are provided. These are useful for producing (meth)acrylic artificial marble having various excellent physical properties such as appearance, dimension stability, hot water resistance, weatherability.

19 Claims, 2 Drawing Sheets

P : 200 mm
Q : 200 mm
$T_1$ : 13 mm
$T_2$ : 15 mm

Insert Screw
$\phi$ 15 mm × 8 mm

P : 200 mm
Q : 200 mm
$T_1$ : 5 mm
$T_2$ : 10 mm
$T_3$ : 15 mm

(METH)ACRYLIC PREMIX, (METH) ACRYLIC SMC OR BMC, AND PROCESS PRODUCING (METH)ACRYLIC ARTIFICIAL MARBLE

This application is a Continuation of International appln. Ser. No. PCT/JP98/01676 Filed on Apr. 13, 1998.

TECHNICAL FIELD

The present invention relates to a (meth)acrylic premix excellent in molding processability, a (meth)acrylic SMC or BMC which is particularly useful as a raw material for (meth)acrylic artificial marble and has excellent molding processability, thickening property and the like, and a process for producing (meth)acrylic artificial marble which has high productivity, and excellent appearance, dimension stability, hot waster resistance, weatherability and the like.

BACKGROUND ART (Meth)acrylic artificial marble which is produced by compounding inorganic fillers such as aluminum hydroxide into a (meth)acrylic resin has various prominent functions and properties such as excellent appearance, soft feeling and the like, and is widely used for counters such as a kitchen counter and the like, washing and dressing stands, waterproof pans, bathtubs, and other architectural uses. Such marble is usually produced by a casting method in which a so-called premix prepared by dispersing inorganic fillers in (meth)acrylic syrup is filled in a mold, and the premix is cured and polymerized at relatively low temperature.

For example, Japanese Patent Application Laid-Open (JP-A) No. 61-26,605 discloses artificial marble in the form of a flat plate obtained by curing a composition comprising (meth)acrylic syrup containing cyclohexyl methacrylate; aluminum hydroxide; and a polymerization initiator having a 10 hours half-life temperature of less than 75° C., under low pressure for long period of time. Further, Japanese Patent Application Laid-Open (JP-A) No. Hei 2-305,842 discloses artificial marble in the form of a flat plate obtained by pouring into a mold a composition comprising (meth) acrylic syrup containing tricyclo[$5.2.1.0^{2,6}$]decanyl (meth) acrylate; a quartz powder; and a polymerization initiator having a 10 hours half-life temperature of less than 75° C., and curing the composition according to a casting method However, the compositions disclosed in Japanese Patent Application Laid-Open (JP-A) Nos. 61-26,605 and Hei 2-305,842 require as long as 2 or more hours for curing and exhibit extremely poor productivity, since a polymerization initiator having a 10 hours half-life temperature of less than 75° C. is used in each case as a curing agent. Then, if these compositions are heated at a temperature of 100° C. or more for curing for the purpose of reducing curing time so as to increase productivity, inconveniences such as cracking, and whitening occur in the resulting molded articles due to low decomposition temperature of the curing agent.

On the other hand, for improving the problem regarding productivity, there has been effected a method for producing (meth)acrylic artificial marble in short period of time by molding with heating and pressurizing a SMC (sheet molding compound) or BMC (bulk molding compound) which is obtained by thickening resin syrup with a thickening agent.

For example, Japanese Patent Application Laid-Open (JP-A) No. Hei 6-313,019 discloses a method for producing artificial marble in the form of a flat plate by molding, with heating at a temperature as high as 115° C. and pressurizing, a (meth)acrylic SMC or BMC prepared by compounding aluminum hydroxide into (meth)acrylic syrup containing as a main component methyl methacrylate.

However, when (meth)acrylic artificial marble is produced by such a method, there occur inconveniences that vapor of methyl methacrylate is generated in a mold, the surface of the molded article is corroded with the methyl methacrylate vapor, gloss at the corroded part decreases and unevenness in gloss occurs, since molding is conducted at a temperature of not less than the boiling point of methyl methacrylate (100° C.). Such tendency becomes remarkable when the curing temperature is further raised for increasing productivity.

Further, the acrylic artificial marble described in Japanese Patent Application Laid-Open (JP-A) No. Hei 6-313,019 tends to be inferior in hot water resistance, and can not be used for uses such as a bathtub in which particularly high hot water resistance is required. The (meth)acrylic SMC or BMC disclosed in this publication has odor specific to (meth)acrylic monomers, and uncomfortable feeling sometimes may occur in handling. Especially when this SMC or BMC is molded at a temperature as high as 100° C. or more, this tendency becomes remarkable. When artificial marble is produced using the (meth)acrylic SMC or BMC disclosed in this publication, there easily occurs inconvenience that the size of a molded article becomes very smaller than that of a mold and goes out of the dimension tolerance of the molded article. Further, the (meth)acrylic SMC or BMC disclosed in this publication requires aging for a long period of time (24 hours or more) for thickening and exhibits low productivity.

On the other hand, Japanese Patent Application Laid-Open (JP-A) No. Hei 6-219,800 discloses artificial stone in the form of a flat plate for use as an architectural material, comprising 5 to 15% by weight of a (meth)acrylic binder resin using a monomer having high boiling point and 85 to 95% by weight of a natural stone particle. However, the herein disclosed composition looks like a stone since the inorganic filler content is high, and has no marble-like deep gorgeous texture or soft feeling. Moreover, since the inorganic filler content is high, flowability of the material is poor and a molded article having complicated form can not be easily obtained.

Further, the molded articles disclosed in Japanese Patent Application Laid-Open (JP-A) Nos. 61-26,605, Hei 2-305, 842 and Hei 6-313,019 described above are all flat plates having uniform thickness. For example, when a molded article having varied thickness is produced and when a molded article is produced with an insert screw being buried in the article, inconvenience that dimple and whitening occur on the thickness varied parts and the surface at the insert screw tends to be caused. This tendency is particularly remarkable when the curing temperature is raised for producing a molded article in short period of time.

DISCLOSURE OF THE INVENTION

The object of the present invention is to provide a (meth)acrylic premix which provides a molded article having low linear shrinkage coefficient and excellent dimension stability, causes no dimple and whitening on the surface at the insert screw, and the thickness varied parts, provides appearance having no unevenness in gloss on the molded article even when the premix is molded at a temperature of 100° C. or more, gives little odor, and exhibits excellent molding processability at high temperature.

The further object of the present invention is to provide a (meth)acrylic SMC or BMC which is particularly useful as a raw material of (meth)acrylic artificial marble and has excellent thickening property, and a method for producing (meth)acrylic artificial marble which has high productivity and produces (meth)acrylic artificial marble having excellent appearance, dimension stability, hot water resistance and weatherability.

The present inventors have studied to accomplish the above-described objects, and as a result, have found that excellent effects can be performed by allowing a (meth)acrylic premix to contain a (meth)acrylate carrying an ester group having specific structure or an organic peroxide having specific structure as a curing agent, completing the present invention.

Namely, the present invention relates to a (meth)acrylic premix comprising 100 parts by weight of a (meth)acrylic resin composition (A) containing a (meth)acrylic monomer (a) and a (meth)acrylic polymer (b), 1 to 500 parts by weight of an inorganic filler (B), and 0.01 to 20 parts by weight of a curing agent (C): wherein,

- the component (a) contains at least one (meth)acrylate selected from the group consisting of a (meth)acrylate carrying an ester group having a bicyclo ring, a (meth)acrylate carrying an ester group having a fluorine atom and a (meth)acrylate carrying an ester group having cyclic ether structure; or
- the component (a) contains at least one (meth)acrylate selected from the group consisting of a (meth)acrylate carrying an ester group having a cyclohexane ring and a (meth)acrylate carrying an ester group having a tricyclo ring, and the component (C) contains a radical polymerization initiator having a 10 hours half-life temperature of 75° C. or more; or
- the component (C) contains at least one organic peroxide represented by any of the following general formulae (I) to (VII):

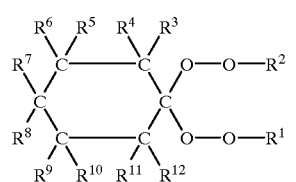

(wherein, $R^1$ and $R^2$ represent a hydrogen atom or a tert-alkyl group having 4 to 6 carbon atoms, and $R^3$ to $R^{12}$ represent a hydrogen atom or an alkyl group having 1 to 4 carbon atoms.),

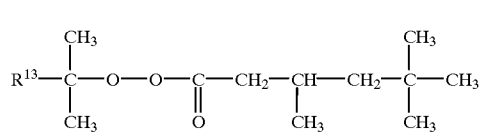

(wherein, $R^{13}$ represents an alkyl group having 1 to 5 carbon atoms.),

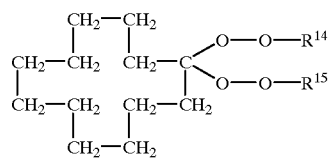

(wherein, $R^{14}$ and $R^{15}$ represent a hydrogen atom or a tert-alkyl group having 4 to 6 carbon atoms, and one or more hydrogen atoms in the cyclododecane ring may be substituted by alkyl groups having 1 to 4 carbon atoms.),

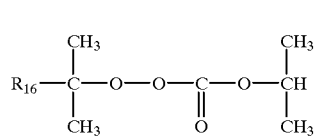

(wherein, $R^{16}$ represents an alkyl group having 1 to 5 carbon atoms.),

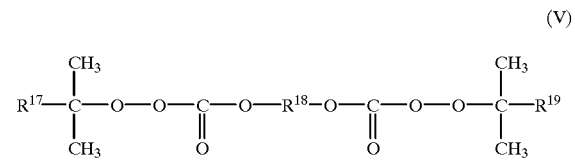

(wherein, $R^{17}$ and $R^{19}$ represent an alkyl group having 1 to 5 carbon atoms, and $R^{18}$ represents an alkylene group having 1 to 10 carbon atoms.),

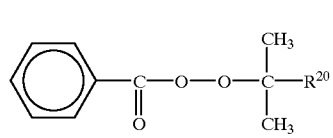

(wherein, $R^{20}$ represents an alkyl group having 2 to 6 carbon atoms, and one or more hydrogen atoms in the benzene ring may be substituted by halogen atoms and/or alkyl groups.), and

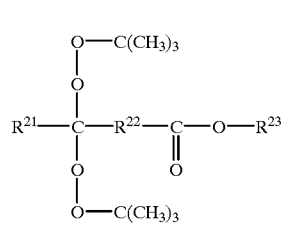

(wherein, $R^{21}$ and $R^{23}$ represent an alkyl group having 1 to 6 carbon atoms, and $R^{22}$ represents an alkylene group having 1 to 6 carbon atoms.)

Further, the present invention relates to a (meth)acrylic SMC or BMC comprising the above-described (meth)acrylic premix and a thickening agent; and a method for producing (meth)acrylic artificial marble wherein the above-described (meth)acrylic SMC or BMC is cured with being pressurized and heated at a temperature from 105 to 150° C.

In the present invention, "(meth)acryl" means "methacryl and/or acryl".

In the present invention, by using a (meth)acrylate carrying an ester group having the above-described specific structure as the component (a), it becomes possible to obtain a (meth)acrylic premix which provides appearance having no unevenness in gloss on the molded article even when the premix is molded at a temperature of 100° C. or more, gives little odor, has excellent molding processability at high temperature, and further, useful as a raw material for (meth) acrylic artificial marble which shows deep appearance excellent in transparency, and which has low liner shrinkage coefficient and excellent dimension stability, and excellent in hot water resistance.

Further, in the present invention, by using the above-described specific radical polymerization initiator (curing agent) as the component (C), it becomes possible to obtain a (meth)acrylic premix which has excellent molding processability at high temperature, and further, useful as a raw material for (meth)acrylic artificial marble which has low liner shrinkage coefficient and excellent dimension stability, causes no dimple and whitening at the insert screw and the thickness varied parts, and excellent in hot water resistance and weatherability.

Furthermore, in the present invention, by allowing the above-described (meth)acrylic premix to contain a thickening agent such as a polymer powder, it becomes possible to obtain a (meth)acrylic SMC or BMC which is further suitable for molding at high temperature, has excellent molding processability and excellent thickening property, and useful as a raw material for (meth)acrylic artificial marble.

Further, in the present invention, by curing with pressuring and heating the SMC or BMC, it becomes possible to produce in high productivity (meth)acrylic artificial marble excellent in appearance, dimension stability, hot water resistance, weatherability and the like. Therefore, the present invention is industrially very useful.

BEST MODE FOR CARRYING OUT THE INVENTION

Figure 1:
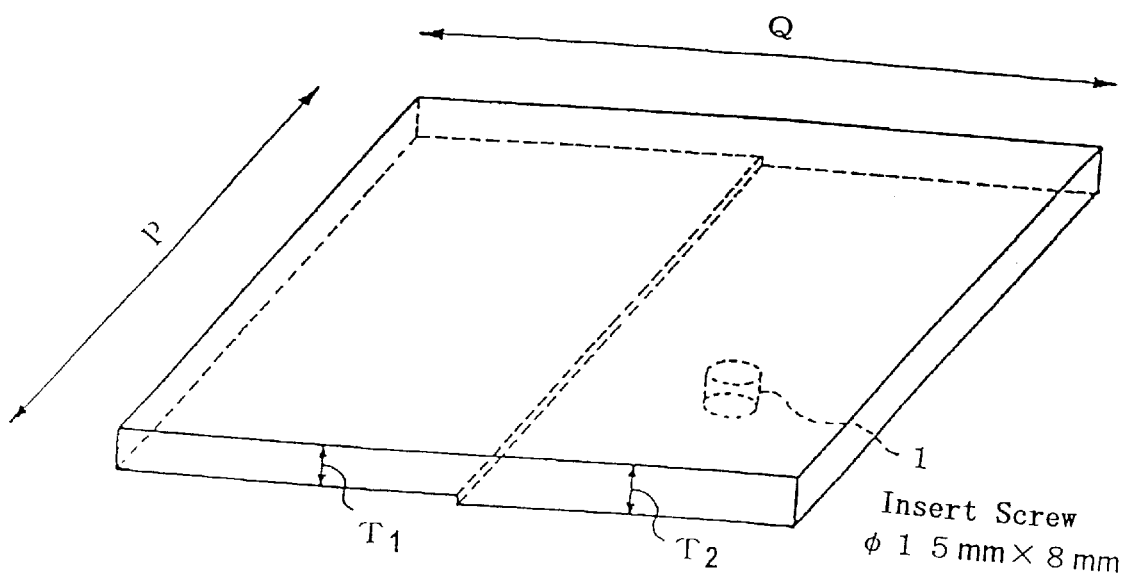
FIG. 1 is a schematic view showing the form of the (meth)acrylic artificial marble obtained in Examples I and II.

The (meth)acrylic monomer (a) constituting the (meth) acrylic premix of the present invention is not particularly restricted in the case when the above-described radical polymerization initiator having specific structure is used as the curing agent (C). When the curing agent (C) is not particularly restricted, the (meth)acrylic monomer (a) preferably contains at least one (meth)acrylate selected from the group consisting of a (meth)acrylate carrying an ester group having a cyclohexane ring, a (meth)acrylate carrying an ester group having a bicyclo ring, a (meth)acrylate carrying an ester group having a tricyclo ring, a (meth)acrylate carrying an ester group having a fluorine atom and a (meth)acrylate carrying an ester group having cyclic ether structure. These (meth)acrylates having specific structure perform action that they prevent occurrence of unevenness in gloss on a molded article obtained by molding at a high temperature of 105° C. or more and provide more excellent appearance.

Among these (meth)acrylates carrying an ester group having specific structure, the (meth)acrylate carrying an ester group having a cyclohexane ring performs action that it gives excellent hot water resistance to a molded article. Examples of the (meth)acrylate carrying an ester group having a cyclohexane ring include, but are not limited to, cyclohexyl (meth)acrylate, methylcyclohexyl (meth)acrylate, dimethylcyclohexyl (meth)acrylate, trimethylcyclohexyl (meth)acrylate, tetramethylcyclohexyl (meth)acrylate, 2-cyclohexylethyl (meth)acrylate, 4-cyclohexylcyclohexyl (meth)acrylate and the like. These may be used optionally alone or in combination of two or more. Cyclohexyl (meth)acrylate is particularly preferred in view of cost.

The (meth)acrylate carrying an ester group having a cyclohexane ring is preferably contained in an amount in the range from 10 to 90% by weight in the (meth)acrylic resin composition (A). When the content of this (meth)acrylate is in this range, there is tendency that the resulting molded article has no unevenness in gloss and has excellent hot water resistance. It is more preferred in the range from 15 to 85% by weight, and particularly preferred in the range from 20 to 80% by weight.

The (meth)acrylate carrying an ester group having a bicyclo ring performs action that it further reduces the liner shrinkage coefficient of the resulting molded article to give excellent dimension stability, and that it imparts excellent hot water resistance to the molded article. Examples of the (meth)acrylate carrying an ester group having a bicyclo ring include, but are not limited to, norbornyl (meth)acrylate, isobornyl (meth)acrylate, bicyclo[3.3.1]nonyl-9-(meth) acrylate, bicyclo[3.2.1]-octyl-2-(meth)acrylate and the like. These may be used optionally alone or in combination of two or more. Isobornyl (meth)acrylate is particularly preferred in view of cost.

The (meth)acrylate carrying an ester group having a bicyclo ring is preferably contained in an amount in the range from 5 to 90% by weight in the (meth)acrylic resin composition (A). When the content of this (meth)acrylate is in this range, there is tendency that the resulting molded article has no unevenness in gloss, the linear shrinkage coefficient of the molded article decreases to increase dimension stability and the molded article has excellent hot water resistance. It is more preferred in the range from 10 to 85% by weight, particularly preferred in the range from 15 to 80% by weight, and most preferred in the range from 20 to 75% by weight.

The (meth)acrylate carrying an ester group having a tricyclo ring performs action that it further reduces the liner shrinkage coefficient of the resulting molded article to give excellent dimension stability, and that it imparts excellent hot water resistance to the molded article. Examples of the (meth)acrylate carrying an ester group having a tricyclo ring include, but are not limited to, adamantyl (meth)acrylate, tricyclo[5.2.1.0$^{2,6}$]-decanyl (meth)acrylate and the like. These may be used optionally alone or in combination of two or more. Tricyclo[5.2.1.0$^{2,6}$]decanyl (meth)acrylate is particularly preferred in view of cost.

The (meth)acrylate carrying an ester group having a tricyclo ring is preferably contained in an amount in the range from 5 to 90% by weight in the (meth)acrylic resin composition (A). When the content of this (meth)acrylate is in this range, there is tendency that the resulting molded article has no unevenness in gloss, the linear shrinkage coefficient of the molded article decreases to increase dimension stability and the molded article has excellent hot water resistance. The content of this (meth)acrylate is more preferred in the range from 10 to 85% by weight, particularly preferred in the range from 15 to 80% by weight.

The (meth)acrylate carrying an ester group having a fluorine atom performs action that it further imparts excellent hot water resistance to the resulting molded article. The ester group having a fluorine atom in the (meth)acrylate is not particularly restricted, and preferably a fluoroalkyl group having 1 to 10 carbon atoms. Examples of the (meth)acrylate carrying an ester group having a fluorine atom include, but are not limited to, trifluoromethyl (meth)acrylate, 2,2,2-trifluoroethyl (meth)acrylate, 2,2,3,3-tetrafluoropropyl (meth)acrylate, 2,2,3,4,4,4-hexafluorobutyl (meth)acrylate, heptadecafluorodecyl (meth)acrylate and the like. These may be used optionally alone or in combination of two or more. 2,2,2-Trifluoroethyl (meth)acrylate is particularly preferred in view of mechanical strength of the molded article.

The (meth)acrylate carrying an ester group having a fluorine atom is preferably contained in an amount in the range from 5 to 90% by weight in the (meth)acrylic resin composition (A). When the content of this (meth)acrylate is in this range, there is tendency that the resulting molded article has no unevenness in gloss, and the molded article has excellent hot water resistance. It is more preferred in the range from 10 to 85% by weight, and particularly preferred in the range from 15 to 80% by weight.

The (meth)acrylate carrying an ester group having a cyclic ether structure performs action that it further reduces odor of the acrylic premix in molding processing at high temperature, and impart excellent handling property. Examples of the (meth)acrylate carrying an ester group having a cyclic ether structure include, but are not limited to, glycidyl (meth)acrylate, tetrahydrofurfuryl (meth)acrylate and the like. These may be used optionally alone or in combination of two or more. Tetrahydrofurfuryl (meth) acrylate is particularly preferred in view of ability to reduce odor.

The (meth)acrylate carrying an ester group having a cyclic ether structure is preferably contained in an amount in the range from 5 to 90% by weight in the (meth)acrylic resin composition (A). When the content of this (meth)acrylate is in this range, there is tendency that the resulting molded article has no unevenness in gloss, and odor generated in molding at high temperature decreases. It is more preferred in the range from 10 to 85% by weight, and particularly preferred in the range from 15 to 80% by weight.

Examples of the (meth)acrylic monomers which can be used as the component (A) in the present invention other than the above-described (meth)acrylates carrying an ester group having the above-described specific structure include monofunctional monomers such as alkyl (meth)acrylates having an alkyl group containing 1 to 20 carbon atoms, hydroxy alkyl (meth)acrylates, benzyl (meth)acrylate, (meth)acrylic acid, metal salts of (meth)acrylic acid, (meth) acrylic amides and the like. These may be used optionally alone or in combination of two or more.

Particularly, to use methyl methacrylate is preferred since then the resulting molded article can be endowed with deep appearance specific to marble and the appearance thereof becomes excellent. In this case, the amount of methyl methacrylate is not particularly restricted, but methyl methacrylate is preferably contained in an amount not more than 50% by weight in the (meth)acrylic resin composition (A). When the content of methyl methacrylate is in this range, there is tendency that the resulting molded article has no unevenness in gloss. It is more preferred in the range not more than 40% by weight, and particularly preferred in the range not more than 35% by weight.

Further, to contain a polyfunctional monomer as the component (a) is preferred since then the resulting molded article tends to be endowed with excellent mechanical strength, solvent resistance, heat resistance and the like. Example of the polyfunctional monomer include ethylene glycol di(meth)acrylate, propylene glycol di(meth)acrylate, 1,3-butylene glycol di(meth)acrylate, 1,4-butylene glycol di(meth)acrylate, 1,6-hexanediol di(meth)acrylate, dimethylolethane di(meth)acrylate, 1,1-dimethylolpropane di(meth) acrylate, 2,2-dimethylolpropane di(meth)acrylate, trimethylolethane tri(meth)acrylate, trimethylolpropane tri(meth) acrylate, tetramethylolmethane di(meth)acrylate, tetramethylolmethane tri(meth)acrylate, tetramethylolmethane tetra(meth)acrylate, neopentyl glycol di(meth) acrylate, polyfunctional esters of (meth)acrylic acid with polyhydric alcohols [poly-ethylene glycol, polypropylene glycol, pentaerythritol, dipentaerythritol and the like], allyl (meth)acrylate and the like. These may be used optionally alone or in combination of two or more.

Particularly, to use neopentyl glycol dimethacylate and/or 1,3-butylene glycol dimethacrylate as the polyfunctional monomer is preferred since then a molded article having extremely excellent surface gloss tends to be obtained and the hot water resistance of the molded article tends to become excellent. In this case, it may also be advantageously possible to use neopentyl glycol dimethacrylate and/or 1,3-butylene glycol dimethacrylate with other polyfunctional monomer.

The amount of the polyfunctional monomer is not particularly restricted, but the polyfunctional monomer is preferably contained in an amount in the range from 1 to 50% by weight in the (meth)acrylic resin composition (A) for obtaining more efficiently the above-described effects. It is more preferred in the range from 3 to 40% by weight, and particularly preferred in the range from 5 to 30% by weight.

The amount of the component (a) is not particularly restricted, but the component (a) is preferably contained in an amount in the range from 10 to 90% by weight in the (meth)acrylic resin composition (A) in view of workability of the (meth)acrylic premix of the present invention, and physical properties such as mechanical strength when this (meth)acrylic premix is used as a raw material of the (meth)acrylic artificial marble. It is more preferred in the range from 15 to 85% by weight, and particularly preferred in the range from 20 to 80% by weight.

The (meth)acrylic premix of the present invention may optionally contain a monomer other than the component (a), namely other than (meth) acrylic monomers. Examples of this monomer include monofunctional monomers such as aromatic vinyls, vinyl acetate, (meth)acrylonitrile, vinyl chloride and maleic anhydride; and polyfunctional monomers such as divinylbenzene and triallyl isocyanurate.

The (meth)acrylic polymer (b) constituting the (meth) acrylic premix of the present invention is a polymer obtained by polymerization using a (meth)acrylic monomer as a main component. As the constituent component (monomer for polymerization) used for obtaining this (meth)acrylic polymer (b), for example, the various monomers exemplified as the afore-said component (a) can be used. These constituent components may be used optionally alone to obtain a homopolymer, or may be used in combination of two or more to obtain a copolymer, and further, optionally a polyfunctional monomer may be copolymerized.

The amount of the component (b) is not particularly restricted, but the component (b) is preferably contained in an amount in the range from 10 to 90% by weight in the (meth)acrylic resin composition (A) in view of workability of the (meth)acrylic premix of the present invention, and physical properties such as mechanical strength when this (meth)acrylic premix is used as a raw material of the (meth)acrylic artificial marble. It is more preferred in the range from 15 to 85% by weight, and particularly preferred in the range from 20 to 80% by weight.

The component (b) may be a cross-linked polymer or non-cross-linked polymer, and can be appropriately selected according to demands. The weight-average molecular weight of the component (b) is preferably in the range from 15,000 to 2,000,000 in view of the flowability of the resulting (meth)acrylic resin composition (A) and the mechanical strength of the resulting molded article.

Component (b) can be produced by a known polymerization method such as a solution polymerization method, bulk polymerization method, emulsion polymerization method, and suspension polymerization method.

In the present invention, the (meth)acrylic resin composition (A) may be a composition obtained by dissolving the component (b) into the component (a), a composition obtained by partially polymerizing the component (a) to form the component (b) which is a polymer thereof in the component (a), or a composition obtained by further adding the component (a) into the above-mentioned composition obtained by partially polymerizing the component (a) or by further adding the component (b) into the above-mentioned partial polymer.

Examples of the inorganic filler (B) constituting the (meth)acrylic premix of the present invention include aluminum hydroxide, silica, amorphous silica, calcium carbonate, barium sulfate, titanium oxide, calcium phosphate, talc, mica, clay, glass powder and the like. Especially when the (meth)acrylic premix of the present invention is used as a molding material for artificial marble, aluminum hydroxide, silica, amorphous silica and glass powder are preferred as the inorganic filler (B).

The content of the component (B) is in the range from 1 to 500 parts by weight based on 100 parts by weight of the (meth)acrylic resin composition (A). When this content is not less than 1 part by weight, there is tendency that the heat resistance of the resulting molded article is excellent and the liner shrinkage coefficient decreases. When this content is not more than 500 parts by weight, it tends to become possible to impart marble-like deep excellent texture to the resulting molded article and occurrence of dimple and whitening at the insert screw and the thickness varied parts of the resulting molded article tends to be suppressed. It is more preferred in the range from 50 to 350 parts by weight, and particularly preferred in the range from 100 to 250 parts by weight.

The curing agent (C) constituting the (meth)acrylic premix of the present invention is not particularly restricted when a (meth)acrylate carrying an ester group having the above-described specific structure is used as the (meth) acrylic monomer (a), and it preferably contains a radical polymerization initiator having a 10 hours half-life temperature of not less than 75° C. When the (meth)acrylic monomer (a) is not particularly restricted, at least one radical polymerization initiator (organic peroxide) represented by any of the above-described general formulae (I) to (VII) is preferably contained. These radical polymerization initiators having specific structures perform action that they suppress occurrence of dimple and whitening at the insert screw and the thickness varied parts of the resulting molded article.

Among these radical polymerization initiators, an initiator represented by any of the general formulae (I) to (VI) performs action that it reduces the linear shrinkage coefficient of the resulting molded article, and particularly, the initiator is preferably used together with at least one (meth) acrylate [component (a)] selected from the group consisting of a (meth) acrylate carrying an ester group having a bicyclo ring and a (meth)acrylate carrying an ester group having a tricyclo ring since then the linear shrinkage coefficient can be further reduced.

Among these radical polymerization initiators, an initiator represented by the general formula (I), (III), (VI) or (VII) performs action that it imparts excellent hot water resistance to the resulting molded article, and the initiator is preferably used together with at least one (meth)acrylate [component (a)] selected from the group consisting of a (meth)acrylate carrying an ester group having a cyclohexane ring, a (meth) acrylate carrying an ester group having a bicyclo ring, a (meth)acrylate carrying an ester group having a tricyclo ring and a (meth)acrylate carrying an ester group having a fluorine atom since then the hot water resistance of the resulting molded article further increases.

Among these radical polymerization initiators, an initiator represented by the general formula (II), (IV) or (V) performs action that it imparts excellent weatherability to the resulting molded article, and the initiator is preferably used together with at least one (meth)acrylate [component (a)] selected from the group consisting of a (meth)acrylate carrying an ester group having a cyclohexane ring, a (meth)acrylate carrying an ester group having a bicyclo ring, a (meth) acrylate carrying an ester group having a tricyclo ring, a (meth)acrylate carrying an ester group having a fluorine atom and a (meth)acrylate carrying an ester group having a cyclic ether group since then the hot water resistance of the resulting molded article further increases.

Examples of $R^1$ and $R^2$ in the general formula (I) include hydrogen atom, t-butyl group, t-pentyl group and t-hexyl group. $R^1$ and $R^2$ may represent different groups. Examples of $R^3$ to $R^{12}$ include a hydrogen atom, methyl group, ethyl group, n-propyl group, i-propyl group, n-butyl group, i-butyl group, sec-butyl group, t-butyl group and the like. $R^3$ and $R^{12}$ may represent different groups. Among them, $R^1$ and $R^2$ preferably represent a t-butyl group or t-hexyl group, and $R^3$ to $R^{12}$ preferably represent a hydrogen atom or methyl group.

Specific examples of the radical polymerization initiator represented by the general formula (I) include 1,1-bis(t-hexyl peroxy)3,3,5-trimethylcyclohexane (manufactured by NOF Corp., trade name: Perhexa TMH, 10 hours half-life temperature=87° C.) in which $R^1$ and $R^2$ represent t-hexyl group, $R^5$, $R^6$ and $R^9$ represent methyl group and other Rs represent hydrogen atom, 1,1-bis(t-amyl peroxy)3,3,5-trimethylcyclohexane (manufactured by Kayaku Akzo Corp., trade name: KD-2, 10 hours half-life temperature= 86° C.) in which $R^1$ and $R^2$ represent t-amyl group, $R^5$, $R^6$ and $R^9$ represent methyl group and other Rs represent hydrogen atom, 1,1-bis(t-hexyl peroxy)cyclohexane (manufactured by NOF Corp., trade name: Perhexa HC, 10 hours half-life temperature=87° C.) in which $R^1$ and $R^2$ represent t-hexyl group, $R^3$ to $R^{12}$ represent hydrogen atom, 1,1-bis(t-butyl peroxy)3,3,5-trimethylcyclohexane (manufactured by NOF Corp., trade name: Perhexa 3M, 10 hours half-life temperature=90° C.) in which $R^1$ and $R^2$ represent t-butyl group, $R^5$, $R^6$ and $R^9$ represent methyl group and other Rs represent hydrogen atom, di-t-butyl peroxy-2-methylcyclohexane (manufactured by NOF Corp., trade name: Perhexa MC, 10 hours half-life temperature=

83° C.) in which $R^1$ and $R^2$ represent t-butyl group, $R^3$ represents a methyl group and other Rs represent hydrogen atom, 1,1-bis(t-butyl peroxy)cyclohexane (manufactured by NOF Corp., trade name: Perhexa C, 10 hours half-life temperature=91° C.) in which $R^1$ and $R^2$ represent t-butyl group, and $R^3$ to $R^{12}$ represents hydrogen atom, and the like.

Examples of $R^{13}$ in the general formula (II) include methyl group, ethyl group, n-propyl group, i-propyl group, n-butyl group, sec-butyl group, t-butyl group, n-pentyl group, neopentyl group and the like. Among them, methyl group and ethyl group are preferred, and ethyl group is particularly preferred.

Specific examples of the radical polymerization initiator represented by the general formula (II) include t-butyl peroxy 3,3,5-trimethylhexanoate (manufactured by NOF Corp., trade name: Perbutyl 355, 10 hours half-life temperature=97° C., or manufactured by Kayaku Akzo Corp., trade name: Trigonox 42, 10 hours half-life temperature=100° C.) in which $R^{13}$ represents methyl group having one carbon atom, t-amyl peroxy 3,3,5-trimethylhexanoate (manufactured by Kayaku Akzo Corp., trade name: Kayaester AN, 10 hours half-life temperature=95° C.) in which $R^{13}$ represents ethyl group having 2 carbon atoms, 1,1,3,3-tetramethylbutyl peroxy-3,5,5-trimethylhexanoate (manufactured by Kayaku Akzo Corp., trade name: KD-78, 10 hours half-life temperature=86° C.) in which $R^{13}$ represents neopentyl group having 5 carbon atoms, and the like.

Examples of $R^{14}$ and $R^{15}$ in the general formula (III) include hydrogen atom, t-butyl, t-pentyl group, t-hexyl group and the like. $R^{14}$ and $R^{15}$ may represent different groups. Among them, t-butyl group is particularly preferred.

Specific examples of the radical polymerization initiator represented by the general formula (III) include 1,1-bis(t-butyl peroxy)cyclododecane(manufactured by NOF Corp., trade name: Perhexa CD, 10 hours half-life temperature 95° C.) in which $R^{14}$ and $R^{15}$ represent t-butyl group, and the like.

Examples of $R^{16}$ in the general formula (IV) include methyl group, ethyl group, n-propyl group, i-propyl group, n-butyl group, i-butyl group, sec-butyl group, t-butyl group, n-pentyl group, neopentyl group and the like. Among them, alkyl groups having 1 to 3 carbon atoms are preferred, and a methyl group is particularly preferred.

Specific examples of the radical polymerization initiator represented by the general formula (IV) include t-butyl peroxyisopropyl carbonate (manufactured by NOF Corp., trade name: Perbutyl I, 10 hours half-life temperature=99° C., or manufactured by Kayaku Akzo Corp., trade name: Kayacarbon BIC-75, 10 hours half-life temperature=97° C.) in which $R^{16}$ represents methyl group having one carbon atom, t-hexyl peroxyisopropyl carbonate (manufactured by NOF Corp., trade name: Perhexyl I, 10 hours half-life temperature=95° C.) in which $R^{16}$ represents n-propyl group having 3 carbon atoms, and the like.

Examples of $R^{17}$ and $R^{19}$ in the general formula (V) include methyl group, ethyl group, n-propyl group, i-propyl group, n-butyl group, i-butyl group, sec-butyl group, t-butyl group, n-pentyl group, neopentyl group and the like. $R^{17}$ and $R^{19}$ may represent different groups. Among them, alkyl groups having 1 to 3 carbon atoms are preferred, and methyl group is particularly preferred. Examples of $R^{18}$ include methylene group, ethylene group, n-propylene group, i-propylene group, n-butylene group, i-butylene group, sec-butylene group, t-butylene group, n-pentylene group, n-hexylene group, n-heptylene group, n-octylene group, n-nonylene group, n-decylene group and the like. Among them, alkylene groups having 2 to 6 carbon atoms are preferred, and a n-hexylene group is particularly preferred.

Specific examples of the radical polymerization initiator represented by the general formula (V) include 1,6-bis(t-butyl peroxycarbornyloxy)hexane (manufactured by Kayaku Akzo Corp., trade name: Kayarene 6-70, 10 hours half-life temperature=75° C.) in which $R^{17}$ and $R^{19}$ represent methyl group having one carbon atom, and $R^{18}$ represents a n-hexylene group having 6 carbon atoms, and the like.

Examples of $R^{20}$ in the general formula (VI) include ethyl group, n-propyl group, i-propyl group, n-butyl group, i-butyl group, sec-butyl group, t-butyl, n-pentyl group, n-hexyl group and the like. Among them, an ethyl group having 2 carbon atoms or a n-propyl group having 3 carbon atoms is preferred.

Specific examples of the radical polymerization initiator represented by the general formula (VI) include t-amyl peroxy benzoate (manufactured by Kayaku Akzo Corp., trade name: KD-1, 10 hours half-life temperature=100° C.) in which $R^{20}$ represents ethyl group having 2 carbon atoms, t-hexyl peroxy benzoate (manufactured by NOF Corp., trade name: Perhexyl Z, 10 hours half-life temperature=99° C.) in which $R^{20}$ represents n-propyl group having 3 carbon atoms, and the like.

Examples of $R^{21}$ and $R^{23}$ in the general formula (VII) include methyl group, ethyl group, n-propyl group, i-propyl group, n-butyl group, i-butyl group, sec-butyl group, t-butyl group, n-pentyl group, n-hexyl group and the like. Among them, $R^{21}$ preferably represents methyl group, and $R^{23}$ preferably represents n-butyl group. Examples of $R^{22}$ include a methylene group, ethylene group, n-propylene group, i-propylene group, n-butylene group, i-butylene group, sec-butylene group, t-butylene group, n-pentylene group, n-hexylene group, and the like. Among them, an ethylene group is preferred.

Specific examples of the radical polymerization initiator represented by the general formula (VII) include n-butyl-4,4-bis(t-butyl peroxy) valerate (manufactured by NOF Corp., trade name: Perhexa V, 10 hours half-life temperature=105° C., or manufactured by Kayaku Akuzo Corp., trade name: Trigonox 17/40, 10 hours half-life temperature=110° C.) in which $R^{21}$ represents methyl group having one carbon atoms, $R^{23}$ represents a n-butyl group having 4 carbon atoms and $R^{22}$ represents an ethylene group having 2 carbon atom, and the like.

The radical polymerization initiators (organic peroxides) represented by any of the general formulae (I) to (VII) listed above may be used alone, or two or more of them which are represented by the same general formula or different general formulae may be used together. Further, the radical polymerization initiator represented by any of the general formulae (I) to (VII) may be optionally used together with various curing agents such as other organic peroxides or azo-based compounds.

Further, when the (meth)acrylate carrying an ester group having the specific structure as described above is used as the component (a) in the present invention, the radical polymerization initiator represented by any of the general formulae (I) to (VII) may not be used, and various curing agents such as other organic peroxides or azo-based compounds can be used as the component (C). Specific examples of the curing agents used in this case include organic peroxides such as t-butyl peroxy-2-ethyl hexanoate (manufactured by NOF Corp., trade name: Perbutyl O, 10 hours half-life temperature=72° C.), benzoyl peroxide (manufactured by NOF Corp., trade name: Niper BW, 10 hours half-life temperature=73° C.), t-butyl peroxy isobutyrate (manufactured by NOF Corp., trade name: Perbutyl IB, 10 hours half-life temperature=77° C.), 2,2-bis(4,4-di-t-butyl peroxycyclohexyl)propane (manufactured by NOF Corp., trade name: Pertetra A, 10 hours half-life temperature=95° C.), t-butyl peroxy laurate (manufactured by NOF Corp., trade name: Perbutyl L, 10 hours half-life temperature=98° C.), diethylene glycol-bis(t-butyl peroxy carbonate) (manufactured by Kayaku Akuzo Corp., trade name: Kayarene O-50, 10 hours half-life temperature=97° C.), t-butyl peroxy-2-ethylhexyl carbonate (manufactured by NOF Corp., trade name: Perbutyl E, 10 hours half-life temperature=99° C.), 2,5-dimethyl-2,5-di(benzoyl peroxy) hexane (manufactured by NOF Corp., trade name: Perhexa 25Z, 10 hours half-life temperature=100° C.), t-butyl peroxy acetate (manufactured by NOF Corp., trade name: Perbutyl A-50, 10 hours half-life temperature=102° C.), t-butyl peroxy benzoate (manufactured by NOF Corp., trade name: Perbutyl Z, 10 hours half-life temperature=104° C.), 2,2-bis (t-butyl peroxy)butane (manufactured by NOF Corp., trade name: Perhexa 22, 10 hours half-life temperature=103° C.), dicumyl peroxide (manufactured by NOF Corp., trade name: Percumyl D, 10 hours half-life temperature=116° C.), 2,5-dimethyl-2,5-di(t-butyl peroxy)hexane (manufactured by NOF Corp., trade name: Perhexa 25B, 10 hours half-life temperature=118° C.), t-butylcumyl peroxide (manufactured by NOF Corp., trade name: Perbutyl C, 10 hours half-life temperature=120° C.), 1,3-bis(t-butyl peroxyisopropyl) benzene (manufactured by Kayaku Akuzo Corp., trade name: Percadox 14, 10 hours half-life temperature=121° C.) and dibutyl peroxide (manufactured by NOF Corp., trade name: Perbutyl D, 10 hours half-life temperature=124° C.); azo compounds such as 2,2'-azobis(2,4-dimethylvaleronitrile) (manufactured by WAKO PURE CHEMICAL INDUSTRIES, LTD., trade name: V-65, 10 hours half-life temperature=51° C.), 2,2'-azobisisobutyronitrile) (manufactured by WAKO PURE CHEMICAL INDUSTRIES, LTD., trade name: V-60, 10 hours half-life temperature=65° C.) and 1,1'-azobis (cyclohexane-1-carbonitrile) (manufactured by WAKO PURE CHEMICAL INDUSTRIES, LTD., trade name: V-40, 10 hours half-life temperature=88° C.); and so on. Among them, it is preferable to use curing agents having a 10 hours half-life temperature of 75° C. or more. These may be used alone or in combination of two or more. Further, these may be used together with the radical polymerization initiator represented by any of the general formulae (I) to (VII).

The content of the component (C) is in the range from 0.01 to 20 parts by weight based on 100 parts by weight of the (meth)acrylic resin composition (A). When this content is 0.01 part by weight or more, there is tendency that the curing property of the (meth)acrylic premix of the present invention is sufficient, and the linear shrinkage coefficient of the resulting molded article decreases in the case when the radical polymerization initiator represented by any of the general formulae (I) to (VI) is used, the hot water resistance is more excellent in the case when the radical polymerization initiator represented by the general formula (I), (III) or (IV) is used and the weatherability is more excellent in the case when the radical polymerization initiator represented by the general formula (II), (IV) or (V) is used. On the other hand, this content is not more than 20 parts by weight, the appearance of the resulting molded article having no dimple and whitening occurred at the insert screw and the thickness varied parts. It is more preferred in the range from 0.1 to 10 parts by weight.

Further, granite-like artificial marble having grain pattern can be obtained by compounding an inorganic filler-containing resin particle into the (meth)acrylic premix of the present invention and molding the resulted mixture. The amount compounded of the inorganic filler-containing resin particle is not particularly restricted, and preferably in the range from 0.1 to 200 parts by weight based on 100 parts by weight of the (meth)acrylic premix. When this amount compounded is 0.1 part by weight or more, there is tendency that grain pattern excellent in design is obtained, and when not more than 200 parts by weight, there is tendency that the kneading property in producing the (meth)acrylic premix is excellent. More preferably, it is in the range from 1 to 100 parts by weight.

As the resin constituting the inorganic filler-containing resin particle, any resin is allowable providing it is not dissolved in methyl methacrylate, and for example, a cross-linked (meth)acrylic resin, cross-linked polyester resin, cross-linked polystyrene resin and the like can be listed. A cross-linked (meth)acrylic resin is preferable since it exhibits high affinity with the (meth)acrylic resin composition (A) used in the present invention and a molded article having beautiful appearance is obtained when this cross-linked resin is used. Further, this cross-linked (meth)acrylic resin may be a resin containing a non-cross-linked (meth)acrylic polymer.

The content of an inorganic filler in the inorganic filler-containing resin particle is preferably in the range from 1 to 500 parts by weight based on 100 parts by weight of a resin constituting the inorganic filler-containing resin particle. When this content is 1 part by weight or more, there is tendency that the heat resistance of the resulting molded article is excellent, and when not more than 500 parts by weight, there is tendency that it become possibles to impart marble-like deep excellent texture to the resulting molded article.

As this inorganic filler, aluminum hydroxide, silica, amorphous silica, calcium carbonate, barium sulfate, titanium oxide, calcium phosphate, talc, mica, clay, glass powder and the like can optionally be used appropriately. Particularly, when a granite-like artificial marble is produced, aluminum hydroxide, silica, amorphous silica and glass powder are preferred as the inorganic filler.

The process for producing the inorganic filler-containing resin particle is not particularly restricted, and for example, there is listed a method in which a resin molded article containing an inorganic filler obtained via polymerization and curing by a heat press method, casting method and the like is ground classified through a sieve. For example, a method in which (meth)acrylic artificial marble is ground and classified is preferred.

In the present invention, it is possible to use one inorganic filler-containing resin particle or two or more inorganic filler-containing resin particles having different colors and particle sizes. The particle size of the inorganic filler-containing resin particle is not particularly restricted provided it is not more than the thickness of the resulting molded article.

The (meth)acrylic premix of the present invention may be subjected without any treatment to heat curing or redox curing, or a thickening agent may be added to the (meth) acrylic premix to produce a (meth)acrylic SMC or BMC, then, the SMC or BMC may be cured with being heated and pressurized. Particularly, the method in which a (meth) acrylic SMC or BMC is produced before curing with heating and pressurizing is preferable from the view-point of productivity.

The thickening agent which is used when a (meth)acrylic SMC or BMC is produced is not particularly restricted, and for example, a magnesium oxide powder, polymer powder and the like can be used. In particular, a polymer powder is preferred since the hot water resistance of the resulting molded article tends to be excellent.

The content of this polymer powder is not particularly restricted, and preferably in the range from 0.1 to 100 parts by weight based on 100 parts by weight of the acrylic resin composition (A). When this content is 0.1 part by weight or more, there is tendency that high thickening effect is manifested, and when not more than 100 parts by weight, there is tendency that the dispersibility of the polymer powder is excellent and advantage in cost is obtained. Preferably, it is in the range from 1 to 80 parts by weight.

This polymer powder used as a thickening agent is not particularly restricted, and can be appropriately selected according to demands. For example, the inorganic filler-containing resin particle described above can be used as a thickening agent. However, it is preferable to use a polymer powder having a bulk density in the range from 0.1 to 0.7 g/ml, an oil absorption in a linseed oil in the range from 60 to 200 ml/100 g, and a degree of swelling in methyl methacrylate of 16-fold or more. When such a specific polymer powder is used as a thickening agent, there is tendency that a (meth)acrylic SMC or BMC excellent in handling property and productivity is obtained, and a molded article having excellent appearance is obtained.

In The reason for the above-described definition is that when the bulk density of the polymer powder is 0.1 g/ml or more, the polymer powder does not easily scatter, the yield in producing the powder increases, dusting in adding the polymer powder to the (meth)acrylic premix and mixing them decreases, and workability becomes excellent, and when the bulk density is not more than 0.7 g/ml, it becomes possible to obtain sufficient thickening effect by using a small amount of the polymer powder, and thickening period of time becomes shorter, therefore, productivity is improved and advantage in cost is obtained. This bulk density is preferably in the range from 0.15 to 0.65 g/ml, and more preferably in the range from 0.2 to 0.6 g/ml.

Another reason for the above-described definition is that when the oil absorption in a linseed oil of the polymer powder is 60 ml/100 g or more, it becomes possible to obtain sufficient thickening effect by using a small amount of the polymer powder, and the thickening period of time becomes shorted, therefore, productivity is improved and advantage in cost is obtained, and when the oil absorption is not more than 200 ml/100 g, the dispersibility of the polymer powder into the (meth)acrylic premix becomes excellent and therefore, the kneading property in producing the (meth)acrylic SMC or BMC becomes excellent. This oil absorption is preferably in the range from 70 to 180 ml/100 g, and more preferably in the range from 80 to 140 ml/100 g.

Further reason for the above-described definition is that when the degree of swelling in methyl methacrylate of the polymer powder is 16-fold or more, the effect for thickening the (meth)acrylic premix becomes sufficient. This degree of swelling is preferably 20-fold or more.

This polymer powder is a non-cross-linked polymer powder or cross-linked polymer powder, and preferably a non-cross-linked polymer powder. The reason for this is that when the polymer powder is a non-cross-linked polymer powder, sufficient thickening effect is obtained in short period of time, and in the case when a (meth)acrylic SMC or BMC containing this polymer powder is used for producing granite-like artificial marble, there is tendency that clearness of grain pattern is improved and unevenness in grain pattern disappears. Such tendency is supposed to occur since after the non-cross-linked polymer powder swells in the (meth)acrylic premix, a part or all of which is quickly dissolved even at room temperature. In the present invention, the non-cross-linked polymer powder means a polymer powder at least of which surface part is constituted from a non-cross-linked polymer powder.

The weight-average molecular weight of the polymer powder used in the present invention is not particularly restricted, and preferably in the range from 100,000 to 2,000,000. When this weight-average molecular weight is 100,000 or more, there is tendency that sufficient thickening effect is obtained in short period of time, and in the case when a (meth)acrylic SMC or BMC containing this polymer powder is used for producing granite-like artificial marble, there is tendency that clearness of grain pattern is improved and unevenness in grain pattern disappears. Further, when this weight-average molecular weight is not more than 2,000,000, there is tendency that occurrence of dimple and whitening at the insert screw and the thickness varied parts of the resulting molded article is suppressed. This weight-average molecular weight is more preferred in the range from 300,000 to 2,000,000, and particularly preferred in the range from 400,000 to 1,000,000.

The specific surface area of the polymer powder used in the present invention is not particularly restricted, and preferably in the range from 1 to 100 $m^2/g$. When, the specific surface area of the polymer powder is 1 $m^2/g$ or more, there is tendency that the solubility of the polymer powder in the (meth)acrylic premix is remarkably improved and a part or all of the polymer powder is dissolved in the acrylic premix, therefore, sufficient thickening effect is obtained by using a small amount of the polymer powder, thickening in short period of time becomes possible and productivity is improved, and further, in the case when a (meth)acrylic SMC or BMC containing this polymer powder is used for producing granite-like artificial marble, there is tendency that clearness of grain pattern is improved and unevenness in grain pattern disappears. When this specific surface area is not more than 100 $m^2/g$, the dispersibility of the polymer powder into the (meth)acrylic premix becomes excellent and therefore, the kneading property in producing the (meth)acrylic SMC or BMC becomes excellent. This specific surface area is more preferred in the range from 3 to 100 $m^2/g$, and particularly preferred in the range from 5 to 100 $m^2/g$.

The average particle size of the polymer powder is not particularly restricted, and preferably in the range from 1 to 250 μm. When the average particle size of the polymer powder is 1 μm or more, there is tendency that the dusting of the polymer powder reduces and the handling property of the polymer powder becomes excellent, and when not more than 250 μm, there is tendency that the appearance of the resulting molded article, particularly the gloss and surface smoothness thereof become excellent. This average particle size is more preferred in the range from 5 to 150 μm, and particularly preferred in the range from 10 to 70 μm.

The polymer powder used in the present invention is preferably a secondary agglomerate which is obtained by agglomerating primary particles each other. When the polymer particle is in the form of the secondary agglomerate, there is tendency that the absorption speed of the component (a) is fast and the thickening property becomes extremely excellent.

In this case, the average particle size of the primary particle of the polymer powder is preferably in the range from 0.03 to 1 µm. When the average particle size of the primary particle is 0.03 µm or more, there is tendency that the yield in producing the polymer powder which is the secondary agglomerate is excellent, and when not more than 1 µm, there is tendency that the sufficient thickening effect is obtained by using a small amount of the polymer powder, thickening is possible in short period of time, productivity increases, and in the case when a (meth)acrylic SMC or BMC containing this polymer powder is used for producing granite-like artificial marble, there is tendency that clearness of grain pattern is improved and unevenness in grain pattern disappears. The average particle size of this primary particle is preferably in the range from 0.07 to 0.7 µm.

As the polymer constituting the polymer particle, various polymers can be appropriately selected according to demands and are not particularly restricted, however, in view of the appearance and the like of the resulting (meth) acrylic artificial marble, a (meth)acrylic polymer is preferred.

The examples of the constituent components (monomers and the like used for polymerization) of the polymer powder include monofunctional monomers such as an alkyl (meth) acrylate carrying an alkyl group having 1 to 20 carbon atoms, hydroxyalkyl (meth)acrylate, benzyl (meth)acrylate, (meth)acrylate having a cyclohexane ring, (meth)acrylate having a bicyclo ring, (meth)acrylate having a tricyclo ring, (meth)acrylate carrying an ester group having cyclic ether structure, (meth)acrylate carrying an ester group having a fluorine atom, (meth)acrylic acid, metal salt of (meth) acrylate, (meth)acrylamide, fumaric acid, fumarate, maleic acid, maleate, aromatic vinyl, vinyl acetate, (meth) acrylonitrile, vinyl chloride and maleic anhydride; polyfunctional monomers such as ethylene glycol di(meth)acrylate, propylene glycol di(meth)acrylate, 1,3-butylene glycol di(meth)acrylate, 1,4-butylene glycol di(meth)acrylate, 1,6-hexane diol di(meth)acrylate, dimethylolethane di(meth) acrylate, 1,1-dimethylolpropane di(meth)acrylate, 2,2-dimethylolpropane di(meth)acrylate, trimethylolethane tri (meth)acrylate, trimethylolpropane tri(meth)acrylate, tetramethylolmethane di(meth)acrylate, tetramethylol-methane tri(meth)acrylate, tetramethylolmethane tetra (meth)acrylate, neopentyl glycol di(meth)acrylate, polyvalent esters of (meth)acrylic acid with polyhydric alcohols [polyethylene glycol, polypropylene glycol, pentaerythritol, dipentaerythritol and the like], allyl (meth)acrylate, divinylbenzene and triallyl isocyanurate; and so on. These may be polymerized alone or two or more of them may be combined and copolymerized according to demands. It is preferable to use a (meth)acrylic monomer in view of affinity with the monomer (a) constituting the (meth)acrylic premix.

Further, the polymer powder used in the present invention can be formed as a polymer powder having so-called core/shell structure constituted from core and shell phases made from polymers having different chemical compositions, structures, molecular weights and the like each other. In this case, the core phase may be composed of a non-cross-linked polymer or a cross-linked polymer, however, the shell phased is preferably composed of a non-cross-linked polymer.

As the constituent components of the core and shell phases of the polymer powder, for example, the various components as exemplified as constituent components of polymer powder. These also may be polymerized alone, or two or more of them may be combined and copolymerized. It is preferable to use methyl methacrylate as a main component in the shell phase, since then affinity with a monomer component constituting the (meth)acrylic premix is improved.

Further, the polymer powder may contain an inorganic filler, however, it is preferable to contain no inorganic filler for further enhancing thickening effect.

The method for producing the polymer powder is not particularly restricted, and for example, known methods such as bulk polymerization, solution polymerization, suspension polymerization, emulsion polymerization and dispersion polymerization are listed. Among them, a method in which an emulsion obtained by emulsion polymerization is subjected to spray drying, freeze drying, acid/salt coagulation or the like to obtain a polymer powder is preferable since it has excellent production efficiency.

Further, various additives such as reinforcing fiber like glass fiber, and carbon fiber, coloring agent, low profile agent, internal releasing agent, polymerization inhibitor and the like, in addition to the above-described polymer powder (thickening agent), can be optionally added to the (meth) acrylic premix of the present invention.

The method for mixing various constituent components to obtain the (meth)acrylic premix of the present invention is not particularly restricted provided it is a method in which substances having high viscosity can be mixed efficiently. For example, a kneader, mixer, roll and extruder can be used.

Further, the above-described known various mixing apparatuses can be used also in producing a (meth)acrylic SMC or BMC by thickening the (meth)acrylic premix of the present invention. Particularly when a non-cross-linked polymer having the above-described specific bulk density and oil absorption is used as a thickening agent, since the acrylic SMC or BMC of the present invention can be thickened to level having no stickiness in a short period of time and aging is not required, various constituent components can be uniformly mixed and simultaneously extruded and shaped into given form to continuously produce an acrylic SMC or BMC.

When the (meth)acrylic premix of the present invention is processed into a (meth)acrylic SMC or BMC, then, cured with being heated and pressurized to produce artificial marble, the production can be conducted by known methods such as a compression molding method, injection molding method, transfer molding method and extrusion molding method.

In this case, the heating temperature is not particularly restricted, and preferably in the range from 105 to 150° C. When the heating temperature is 105° C. or more, there is tendency that heating with stream becomes possible, heating cost lowers, and the curing time can be shortened and the productivity increases. On the other hand, when the heating temperature is not more than 150° C., there is tendency that the linear shrinkage coefficient of the resulting molded article decreases, and occurrence of dimple and whitening at the insert screw and the thickness varied parts of the resulting molded article tends to be suppressed. The heating temperature is more preferred in the range from 105 to 140° C., and particularly preferred in the range from 110 to 130° C. Further, when curing with heating and pressurizing is conducted, a upper mold and a lower mold may be heated at different temperatures in the above-described temperature range.

The compression pressure is preferably in the range from 10 to 200 kg/cm$^2$. When the compression pressure is 10 kg/cm$^2$ or more, there is tendency that the filling property of a (meth)acrylic SMC or BMC into a mold is excellent, and when the compression pressure is not more than 200 kg/cm$^2$, there is tendency that excellent appearance of the resulting molded article having no dimple is obtained. This compression pressure is more preferred in the range from 20 to 150 kg/cm$^2$.

The molding time may advantageously be selected appropriately according to the thickness of the resulting molded article.

The present invention will be explained in detail with referring to examples. Part(s) and % in the examples are all by weight unless otherwise stated.

<Measurement of Linear Shrinkage Coefficient of Molded Article>

The actual size (L mm) of a molded article was measured, and shrinkage extent based on the size of a mold ($L_0$ mm) was calculated according to the following equation.

$$\text{Linear shrinkage coefficient } (\%) = \{(L_0-L)/L_0\} \times 100 \ (\%)$$

<Hot Water Resistance of Molded Article>

A molded plate was immersed in hot water of 98° C. for 120 hours, and changes in color properties (whiteness, color difference, yellowing) were compared based on the plate before the immersion.

<Weatherability of Molded Article>

A molded article was subjected to accelerated weathering test using Sunshine Weatherometer WEL-SUN-DC type manufactured by Suga Shikenki K.K., under conditions of a black panel temperature of 63° C., a rainfall (spraying) time of 12 minutes during 60 minutes, and a treating time of 500 hours, and changes in color properties (whiteness, color difference, yellowing) before and after the test were evaluated according to JIS Z 8730-1980.

<Physical Property of Polymer Powder>

Average particle size: It was measured using laser scattering particle size distribution analyzer (LA-910, manufactured by HORIBA Ltd.)

Bulk density: It was measured according to JIS R 6126-1970.

Oil absorption: It was measured according to JIS K 5101-1991, and time directly before a putty-like lamp is steeply softened with the last one drop of linseed oil was recognized as terminal point.

Specific surface area: It was measured by a nitrogen adsorption method using a surface area meter SA-6201 (manufactured by HORIBA Ltd.).

Weight average molecular weight: Measured value by GPC method (in terms of polystyrene) was calculated.

Degree of swelling: A polymer powder was charged in a 100 ml measuring cylinder, the cylinder was tapped weakly several times to compact the powder to 5 ml, then, to this was charged methyl methacrylate cooled to 10° C. or lower so that the total amount was 100 ml, and the mixture was stirred quickly until the mixture became totally uniform, then, the measuring cylinder was kept in a thermostat at 25° C. for 1 hour, the volume of the polymer powder layer after swelling was measured, and the degree of swelling was represented by ratio to the volume (5 ml) of the polymer powder layer before swelling.

(1) Production Example of Polymer Powder (P-1)

Into a reaction apparatus equipped with a cooling tube, thermometer, stirrer, dropping apparatus and nitrogen introducing tube was charged 925 parts of distilled water, 5 parts of sodium alkyldiphenyl ether disulfonate (manufactured by Kao Corp., trade name: Pelex SS-H), and 1 part of potassium persulfate, and the resulting mixture was heated at 70° C. with stirring under nitrogen atmosphere. To this was added a mixture of 500 parts of methyl methacrylate and 5 parts of sodium dialkylsulfosuccinate (manufactured by Kao Corp., trade name: Pelex OT-P) dropwise over 3 hours, then, kept for 1 hour, and further heated up to 80° C. and kept for 1 hour for completing emulsion polymerization, to obtain an emulsion containing a polymer primary particle having an average particle size of 0.08 μm.

The resulted emulsion was spray-dried using spray drier L-8 manufactured by OHKAWARA KAKOHKI Co. Ltd. at inlet temperature/outlet temperature=150° C./90° C., to obtain a non-cross-linked polymer powder (P-1) containing a secondary agglomerate particle having an average particle size of 30 μm. The resulted non-cross-linked polymer powder (P-1) had a bulk density of 0.40 g/ml, an oil absorption in linseed oil of 100 ml/100 g, a specific surface area of 51 m²/g and a weight-average molecular weight of 600,000, and this polymer powder was completely dissolved in methyl methacrylate and had a degree of swelling of 20-fold or more.

(2) Production Example of Polymer Powder (P-2)

Into a reaction apparatus equipped with a cooling tube, thermometer, stirrer, dropping apparatus and nitrogen introducing tube was charged 925 parts of distilled water, 5 parts of sodium alkyldiphenyl ether disulfonate, and 1 part of potassium persulfate, and the resulting mixture was heated at 70° C. with stirring under nitrogen atmosphere. To this was added a mixture of 149.85 parts of methyl methacrylate, 0.15 parts of 1,3-butylene glycol dimethacrylate and 5 parts of sodium dialkylsulfosuccinate drop-wise over 1.5 hours, then, kept for 1 hour, subsequently 350 parts of methyl methacrylate was added to the mixture dropwise over 3.5 hours, then kept for 1 hour, and further heated up to 80° C. and kept for 1 hour for completing emulsion polymerization, to obtain an emulsion containing a polymer primary particle having an average particle size of 0.10 μm.

The resulted emulsion was spray-dried in the same manner as for the polymer powder (P-1), to obtain a polymer powder (P-2) which contains a secondary agglomerate particle having an average particle size of 20 μm and has core/shell structure in which the core phase is composed of a cross-linked polymer and the shell phase is composed of a non-cross-linked polymer. The physical properties of the resulted polymer powder are shown in Table 1.

(3) Production Example of Polymer Powder (P-3)

Emulsion polymerization was conducted in the same manner as for the polymer powder (P-1) except that the amount charged of potassium persulfate was 0.25 parts, and the mixture to be added dropwise was a mixture of 497.5 parts of methyl methacrylate, 2.5 parts of 1,3-butylene glycol dimethacrylate and 5 parts of sodium dialkylsulfosuccinate, to obtain an emulsion containing a polymer primary particle having an average particle size of 0.18 μm.

The resulted emulsion was spray-dried in the same manner as for the polymer powder (P-1), to obtain a cross-linked polymer powder (P-3) containing a secondary agglomerate particle having an average particle size of 18 μm.

(4) Production Example of Polymer Powder (P-4)

An emulsion containing a polymer primary particle having an average particle size of 0.10 μm was obtained in the same manner as for the polymer powder (P-1) except that the solution to be charged previously was composed 925 parts of distilled water, 5 parts of polyoxyethylenenonylphenyl ether (manufactured by Kao. Corp., trade name: Emulgen 930) and 1.5 parts of potassium persulfate, and the mixture to be added dropwise was a mixture of 500 parts of methyl methacrylate and 10 parts of sodium dialkylsulfosuccinate.

The resulted emulsion was spray-dried in the same manner as for the polymer powder (P-1), to obtain a non-cross-linked polymer powder (P-4) containing a secondary agglomerate particle having an average particle size of 20 μm. The physical properties of the resulted polymer powder are shown in Table 1.

(5) Production Example of Polymer Powder (P-5)

An emulsion containing a polymer primary particle having an average particle size of 0.11 μm was obtained in the same manner as for the polymer powder (P-1) except that the solution to be charged previously was composed 625 parts of distilled water, 3 parts of alkyldiphenyl ether disulfonic acid and 0.5 parts of potassium persulfate.

The resulted emulsion was spray-dried in the same manner as for the polymer powder (P-1), to obtain a non-cross-linked polymer powder (P-5) containing a secondary agglomerate particle having an average particle size of 50 μm. The physical properties of the resulted polymer powder are shown in Table 1.

(6) Production Example of Polymer Powder (P-6)

An emulsion containing a polymer primary particle having an average particle size of 0.10 μm was obtained in the same manner as for the polymer powder (P-1) except that the amount to be charged previously of potassium persulfate was 0.25 parts.

The resulted emulsion was spray-dried in the same manner as for the polymer powder (P-1), to obtain a non-cross-linked polymer powder (P-6) containing a secondary agglomerate particle having an average particle size of 20 μm. The physical properties of the resulted polymer powder are shown in Table 1.

(7) Production Example of Polymer Powder (P-7)

Into a reaction apparatus equipped with a cooling tube, thermometer, stirrer, and nitrogen introducing tube was charged a monomer solution which was prepared by dissolving 1 part of polyvinyl alcohol (degree of saponification 88%, degree of polymerization 1000) in 800 parts of distilled water, then, dissolving 400 parts of methyl methacrylate and 0.5 parts of azobisisobutylonitrile, and the solution was heated up to 80° C. over 1 hour with stirring at 500 rpm under nitrogen atmosphere. After this, the solution was heated up to 90° C. and heated for 2 hours, then, the remaining monomers were distilled off with water by further heating at 120° C. to obtain a slurry and to complete suspension polymerization. The resulted slurry was filtered and washed, then, dried by a hot air drier at 50° C., to obtain a non-cross-linked polymer powder (P-7) having an average particle size of 30 μm. The physical properties of the resulted polymer powder are shown in Table 1.

(8) Production Example of Polymer Powder (P-8)

A cross-linked polymer (P-8) having an average particle size of 30 μm was obtained in the same manner as for the polymer powder (P-7) except that the monomer solution to be charged was composed of 398 parts of methyl methacrylate, 2 parts by neopentyl glycol dimethacrylate, 0.4 parts of n-dodecylmercaptane and 1.2 parts of azobisisobutyronitrile, to obtain a cross-linked polymer powder (P-8) having an average particle size of 30 μm. The physical properties of the resulted polymer powder are shown in Table 1.

(9) Production Example of Polymethyl Methacrylate (B-1) in Acrylic Syrup

Into a reaction apparatus equipped with a cooling tube, thermometer, stirrer, and nitrogen introducing tube was charged a monomer solution which was prepared by dissolving 1 part of polyvinyl alcohol (degree of saponification 88%, degree of polymerization 1000) in 800 parts of distilled water, then, dissolving 400 parts of methyl methacrylate, 2 parts of n-dodecylmercaptan and 2 parts of azobisisobutyronitrile, and the solution was heated up to 80° C. over 1 hour with stirring at 400 rpm under nitrogen atmosphere, and heated for 2 hours under this condition. After this, the solution was heated up to 90° C. and heated for 2 hours, then, the remaining monomers were distilled off with water by further heating at 120° C. to obtain a slurry and to complete suspension polymerization. The resulted slurry was filtered and washed, then, dried by a hot air drier at 50° C., to obtain polymethyl methacrylate (B-1) having an average particle size of 93 μm. The weight-average molecular weight of the resulted polymer (B-1) was 40,000. The various physical properties are shown in Table 2.

(10) Production Example of Polycyclohexyl Methacrylate (B-2)

Polycyclohexyl methacrylate (B-2) was obtained in the same manner as in Production Example (9) except that cyclohexyl methacrylate was used instead of methyl methacrylate.

(11) Production Example of Inorganic Filler-containing Resin

To 100 parts of an acrylic resin composition composed of 69% of methyl methacrylate, 2% of ethylene glycol dimethacrylate and 29% of the polymethyl methacrylate (B-1) obtained in the above-described Production Example (9) was added 2.0 parts of t-butyl peroxy benzoate (manufactured by NOF Corp. trade name: Perbutyl Z) as a curing agent, 0.5 parts of zinc stearate as an internal releasing agent and 0.25 parts of a white inorganic pigment or black inorganic pigment, then, to this mixture was added 200 parts of aluminum hydroxide (manufactured by Showa Denko K.K., trade name: Higilite H-310) as an inorganic filler and further was added 30 parts of the polymer powder (P-1) obtained in the above-described Production Example (1), and the resulting mixture was kneaded by a kneader for 10 minutes to obtain a (meth)acrylic BMC. Then, this (meth)acrylic premix was filled in a flat type mold for molding of 200 mm square, and cured with being heated and pressurized at a mold temperature of 130° C. and a pressure of 100 kg/cm$^2$ for 10 minutes, to obtain a (meth)acrylic artificial marble having a thickness of 10 mm. The resulted (meth)acrylic artificial marble was broken by a crusher to obtain a white or black inorganic filler-containing resin particle having an average particle size of 350 μm. Physical properties thereof are shown in Table 3.

TABLE 1

| polymer powder | composition of polymer powder | powder properties of polymer powder ||||||| 
| | | average particle size of primary particle (μm) | average particle size of secondary agglomerated particle (μm) | bulk density (g/ml) | oil absorption (ml/100 g) | degree of swelling (fold) | specific surface area (m²/g) | weight-average molecular weight |
| --- | --- | --- | --- | --- | --- | --- | --- | --- |
| P-1 | MMA = 100 | 0.08 | 30 | 0.40 | 100 | 20-fold or more | 51 | 600,000 |
| P-2 | core phase :MMA/BDMA = 99.9/0.1 shell phase :MMA = 100 | 0.10 | 20 | 0.38 | 100 | 20-fold or more | 51 | shell phase 600,000 |
| P-3 | MMA/BDMA = 99.5/0.5 | 0.18 | 18 | 0.38 | 95 | 20-fold or more | 24 | — |
| P-4 | MMA = 100 | 0.10 | 20 | 0.38 | 100 | 20-fold or more | 50 | 400,000 |
| P-5 | MMA = 100 | 0.11 | 50 | 0.50 | 90 | 20-fold or more | 49 | 900,000 |
| P-6 | MMA = 100 | 0.10 | 20 | 0.38 | 100 | 20-fold or more | 50 | 1,400,000 |
| P-7 | MMA = 100 | 30 | — | 0.58 | 50 | 1.2 | 0.2 | 1,200,000 |
| P-8 | MMA/NPGDMA = 99.5/0.5 | 30 | — | 0.57 | 50 | 5.6 | 0.2 | — |

MMA: methyl methacrylate
BDMA: 1,3-butylene glycol dimethacrylate
NPGDMA: neopentyl glycol dimethacrylate

TABLE 2

| polymer (b) | composition of polymer (b) | powder properties of polymer (b) |||||| 
| | | average particle size (μm) | bulk density (g/ml) | oil absorption (ml/100 g) | degree of swelling (fold) | specific surface area (m²/g) | weight-average molecular weight |
| --- | --- | --- | --- | --- | --- | --- | --- |
| B-1 | MMA = 100 | 93 | 0.70 | 45 | 1.2 | 0.07 | 40,000 |
| B-2 | CHMA = 100 | 150 | 0.71 | 45 | 1.2 | 0.07 | 40,000 |

MMA: methyl methacrylate
CHMA: cyclohexyl methacrylate

TABLE 3

| inorganic filler-containing resin particle | powder properties of inorganic filler-containing resin particle |||||
| | average particle size (μm) | bulk density (g/ml) | oil absorption (ml/100 g) | degree of swelling (fold) | specific surface area (m²/g) |
| --- | --- | --- | --- | --- | --- |
| C | 350 | 0.82 | 45 | 1.1 | 15 |

EXAMPLE a1-1

To 100 parts of a (meth)acrylic resin composition composed of 25% of cyclohexyl methacrylate (manufactured by Mitsubishi Rayon Co., Ltd., trade name: Acryester CH), 23% of methyl methacrylate (manufactured by Mitsubishi Rayon Co., Ltd., trade name: Acryester M), 25% of neopentyl glycol dimethacrylate (manufactured by SHINNA-KAMURA KAGAKU KOGYO K.K., trade name: NK ester NPG), 2% of ethylene glycol dimethacrylate (manufactured by Mitsubishi Rayon Co., Ltd., trade name: Acryester ED) and 25% of the polymethyl methacrylate (B-1) obtained in Production Example (9) was added 2.0 parts of 1,1-bis(t-butyl peroxy)3,3,5-trimethylcyclohexane (manufactured by NOF Corp., Perhexa 3M, 10 hours Via half-life temperature=90° C.) in which $R^1$ and $R^2$ represent t-butyl group, $R^5$, $R^6$ and $R^9$ represent methyl group and other Rs represent hydrogen atom in the general formula (I) as a curing agent and 0.5 parts of zinc stearate as an internal releasing agent, then, to this mixture was added 195 parts of aluminum hydroxide (manufactured by Showa Denko K.K., trade name: Higilite H-310) as an inorganic filler and further was added 25 parts of the polymer powder (P-1) obtained in the above-described Production Example (1), and the resulting mixture was kneaded by a kneader for 10 minutes to obtain a (meth)acrylic BMC. The resulted (meth)acrylic BMC had no stickiness even directly after kneading and manifested extremely excellent handling property.

Then, the resulted (meth)acrylic BMC was filled in a mold for molding, and cured with being heated and pressurized at a upper mold temperature of 140° C., a lower mold temperature of 125° C. and a pressure of 100 kg/cm² for 10 minutes, to obtain a (meth)acrylic artificial marble in the form of a flat plate of 200 mm square having a constant thickness of 10 mm.

The surface of the resulted molded article had no unevenness in gloss, and had extremely high gloss and extremely excellent appearance. Further, color change after immersion in hot water of the resulted article was extremely low and hot water resistance thereof was extremely excellent.

EXAMPLES a1-2 TO a1-5

(Meth)acrylic artificial marble was obtained in the same mamatner as in Example a1-1 except that composition shown in Table 4 was used. Evaluation results are shown in Table 4.

EXAMPLE a1-6

To 100 parts of a (meth)acrylic resin composition composed of 24% of cyclohexyl methacrylate, 24% of methyl methacrylate, 15% of neopentyl glycol dimethacrylate, 2% of ethylene glycol dimethacrylate and 35% of the polymethyl methacrylate (B-1) obtained in Production Example (9) was added 2.0 parts of 1,1-bis(t-butyl peroxy)3,3,5-trimethylcyclohexane as a curing agent and 0.5 parts of zinc stearate as an internal releasing agent, then, to this mixture was added as an inorganic filler 170 parts of aluminum hydroxide and 70 parts of the black and white inorganic filler-containing resin particles in total obtained in the above-described Production Example (11), and further was added 25 parts of the polymer powder (P-1) obtained in the above-described Production Example (1), and the resulting mixture was kneaded by a kneader for 10 minutes to obtain a (meth)acrylic BMC. The resulted (meth)acrylic BMC had no stickiness even directly after kneading and manifested extremely excellent handling property.

Then, granite-like (meth)acrylic artificial marble was obtained in the same manner as in Example a1-1. The evaluation results are shown in Table 4.

COMPARATIVE EXAMPLES 1 TO 2

(Meth)acrylic artificial marble was obtained in the same manner as in Example a1-1 except that 2.0 parts of t-butyl peroxy betzoate (manufactured by NOF Corp., trade name: Perbutyl Z, 10 hours half-life temperature=104° C.) was used as a curing agent and other composition was as shown in Table 4. The evaluation results are shown in Table 4.

COMPARATIVE EXAMPLE 3

(Meth)acrylic artificial marble was obtained in the same manner as in Example al-I except that 10 parts of 2,2'-azobis-(2,4-dimethylvaleronitrile) (manufactured by WAKO PURE CHEMICAL INDUSTRIES, Ltd., trade name: V-65, 10 hours half-life temperature=51° C.) was used as a curing agent and other composition was as shown in Table 4. The evaluation results are shown in Table 4.

EXAMPLES a2-1 TO a2-7

(Meth)acrylic artificial marble was obtained in the same manner as in Example a1-1 except that isobornyl methacrylate (manufactured by Mitsubishi Rayon Co., Ltd., trade name: Acryester IBX) or isobornyl acrylate (KYOEISHA KAGAKU K.K., Light Acrylate IB-XA) was used instead of cyclohexyl methacrylate and other composition was as shown in Table 5. The evaluation results are shown in Table 5.

EXAMPLE a2-8

Granite-like (meth)acrylic artificial marble was obtained in the same manner as in Example a1-6 except that isobornyl methacrylate was used instead of cyclohexyl methacrylate. The evaluation results are shown in Table 5.

COMPARATIVE EXAMPLES 4 TO 5

(Meth)acrylic artificial stone was obtained in the same manner as in Comparative Example 3 except that isobornyl methacrylate or isobornyl acrylate was used instead of cyclohexyl methacrylate. The evaluation results are shown in Table 5.

EXAMPLES a3-1 TO a3-7

(Meth)acrylic artificial marble was obtained in the same manner as in Example a1-1 except that tricyclo[5.2.1.0$^{2,6}$]-decanyl methacrylate (manufactured by Hitachi Chemical Co., Ltd., trade name Fancryl FA-513M) or tricyclo[5.2.1.0$^{2,6}$]decanyl acrylate (manufactured by Hitachi Chemical Co., Ltd., trade name Fancryl FA-513A) was used instead of cyclohexyl methacrylate and other composition was as shown in Table 6. The evaluation results are shown in Table 6.

EXAMPLE a3-8

Granite-like (meth)acrylic artificial marble was obtained in the same manner as in Example a1-6 except that tricyclo [5.2.1.0$^{2,6}$]decanyl methacrylate was used instead of cyclohexyl methacrylate. The evaluation results are shown in Table 6.

EXAMPLES a4-1 TO a4-7

(Meth)acrylic artificial marble was obtained in the same manner as in Example a1-1 except that 2,2,2-trifluoroethyl methacrylate (manufactured by Mitsubishi Rayon Co., Ltd., trade name: Acryester 3FE) was used instead of cyclohexyl methacrylate. The evaluation results are shown in Table 7.

EXAMPLE a4-8

Granite-like (meth)acrylic artificial marble was obtained in the same manner as in Example a1-1 except that 2,2,2-trifluoroethyl methacrylate was used instead of cyclohexyl methacrylate. The evaluation results are shown in Table 7.

EXAMPLES a5-1 TO a5-6

(Meth)acrylic artificial marble was obtained in the same manner as in Example a1-1 except that tetrahydrofurfuryl methacrylate (manufactured by Mitsubishi Rayon Co., Ltd., trade name: Acryester THF) was used instead of cyclohexyl methacrylate and composition was as shown in Table 8. The BMC after kneading gave no odor, and no odor was recognized in producing this BMC, namely, this compound manifested extremely excellent handling property. The evaluation results are shown in Table 8.

EXAMPLE a5-7

Granite-like (meth)acrylic artificial marble was obtained in the same manner as in Example a1-6 except that tetrahydrofurfuryl methacrylate was used instead of cyclohexyl methacrylate. The evaluation results are shown in Table 8.

EXAMPLE I-1

To 100 parts of a (meth)acrylic resin composition composed of 55% of methyl methacrylate, 10% of 1,3-butylene glycol dimethacrylate (manufactured by Mitsubishi Rayon Co., Ltd., trade name: Acryester BD) and 35% of the polymethyl methacrylate (B-1) obtained in Production Example (9) was added 2.1 parts of 1,1-bis(t-butyl peroxy) cyclohexane (manufactured by NOF Corp., Perhexa C, 10 hours half-life temperature=91° C.) in which $R^1$ and $R^2$ represent t-butyl group and $R^3$ to $R^{12}$ represent hydrogen atom in the general formula (I) as a curing agent and 0.5 parts of zinc stearate as an internal releasing agent, then, to this mixture was added 210 parts of aluminum hydroxide (manufactured by Showa Denko K.K., trade name: Higilite H-310) as an inorganic filler and further was added 35 parts of the polymer powder (P-1) obtained in the above-described Production Example (1), and the resulting mixture was kneaded by a kneader for 10 minutes to obtain a (meth)acrylic BMC.

The resulted (meth)acrylic BMC had no stickiness even directly after kneading and manifested extremely excellent handling property.

Then, the resulted (meth)acrylic BMC was filled in a mold for molding, and cured with being heated and pressurized at a upper mold temperature of 125° C., a lower mold temperature of 110° C. and a pressure of 100 kg/cm² for 10 minutes, to obtain a (meth)acrylic artificial marble in the form of a plate of 200 mm square having variation in thickness into which an insert screw 1 having a diameter of 15 mm and a length of 8 mm had been inserted. The form of the resulted molded article is shown in FIG. 1 (width P=200 mm, length Q=200 mm, thickness $T_1$=13 mm, thickness $T_2$=15 mm). The surface of the resulted article had extremely high gloss, exhibited mirror-like appearance having no defect, and the surface smoothness was extremely high. No dimple and whitening were recognized at all at the insert screw and the thickness varied parts, and the appearance was extremely excellent. The linear shrinkage coefficient of the resulted article was as low as 0.72%, and hot water resistance of the molded article was also excellent. The evaluation results are shown in Table 10.

EXAMPLE I-2

(Meth)acrylic artificial marble having form shown in FIG. 1 was obtained in the same manner as in Example I-1 except that 1.8 parts of 1,1-bis(t-butyl peroxy)3,3,5-trimethylcyclohexane in which $R^1$ and $R^2$ represent t-butyl group, $R^5$, $R^6$ and $R^9$ represent methyl group and other Rs represent hydrogen atom in the general formula (I) was used as a curing agent, and other composition was as shown in Table 9. The evaluation results are shown in Table 10.

EXAMPLE I-3

(Meth)acrylic artificial marble having form shown in FIG. 1 was obtained in the same manner as in Example I-1 except that 2.1 parts of 1,1-bis(t-hexyl peroxy)cyclohexane (manufactured by NOF Corp., trade name: Perhexa HC, 10 hours half-life temperature=87° C.) in which $R^1$ and $R^2$ represent t-hexyl group and $R^3$ to $R^{12}$ represent hydrogen atom in the general formula (I) was used as a curing agent, and other composition was as shown in Table 9. The evaluation results are shown in Table 10.

EXAMPLE I-4

(Meth)acrylic artificial marble having form shown in FIG. 1 as obtained in the same manner as in Example I-1 except that 2.7 parts of 1,1-bis(t-hexyl peroxy)3,3,5-trimethylcyclohexane (manufactured by NOF Corp., trade name: Perhexa TMH, 10 hours half-life temperature=87° C.) in which $R^1$ and $R^2$ represent t-hexyl group, $R^5$, $R^6$ and $R^9$ represent methyl group and other Rs represent hydrogen atom in the general formula (I) was used as a curing agent, and other composition was as shown in Table 9. The evaluation results are shown in Table 10.

EXAMPLE I-5

(Meth)acrylic artificial marble having form shown in FIG. 1 was obtained in the same manner as in Example I-1 except that composition was as shown in Table 9. The evaluation results are shown in Table 10.

EXAMPLE I-6

(Meth)acrylic artificial marble having form shown in FIG. 1 was obtained in the same manner as in Example I-1 except that 1.8 parts of 1,1-bis(t-amyl peroxy)3,3,5-trimethylcyclohexane (manufactured by Kayaku Akuzo Corp., trade name: KD-2, 10 hours half-life temperature=86° C.) in which $R^1$ and $R^2$ represent t-amyl group, $R^5$, $R^6$ and $R^9$ represent methyl group and other Rs represent hydrogen atom in the general formula (I) was used as a curing agent, and other composition was as shown in Table 9. The evaluation results are shown in Table 10.

EXAMPLE I-7

Granite-like (meth)acrylic artificial marble having form shown in FIG. 1 was obtained in the same manner as in Example I-1 except that composition was as shown in Table 9. The evaluation results are shown in Table 10.

COMPARATIVE EXAMPLE 6

(Meth)acrylic artificial marble having form shown in FIG. 1 was obtained in the same manner as in Example I-1 except that 2.8 parts of t-butyl peroxy benzoate (manufactured by NOF Corp., trade name: Perbutyl Z, 10 hours half-life temperature=104° C.) in which $R^{20}$ represents methyl group having one carbon atom in the general formula (VI) was used as a curing agent, and other composition was as shown in Table 9. The evaluation results are shown in Table 10.

COMPARATIVE EXAMPLE 7

(Meth)acrylic artificial marble having form shown in FIG. 1 was obtained in the same manner as in Example I-1 except that 1.8 parts of t-amyl peroxy 2-ethyl hexanoate (manufactured by Kayaku Akuzo Corp., trade name: Trigonox 121-50, 10 hours half-life temperature=70° C.) was used as a curing agent, and other composition was as shown in Table 9. The evaluation results are shown in Table 10.

COMPARATIVE EXAMPLE 8

(Meth)acrylic artificial marble having form shown in FIG. 1 was obtained in the same manner as in Example I-1 except that 0.8 parts of t-butyl peroxy 2-ethyl hexanoate (manufactured by NOF Corp., trade name: Perbutyl O, 10 hours half-life temperature=72° C.) was used as a curing agent, and other composition was as shown in Table 9. The evaluation results are shown in Table 10.

COMPARATIVE EXAMPLE 9

(Meth)acrylic artificial marble having form shown in FIG. 1 was obtained in the same manner as in Example I-1 except that 12 parts of 2,2-bis(t-butyl peroxy)butane (manufactured by NOF Corp., trade name: Perhexa 22, 10 hours half-life temperature=103° C.), 2 parts of bis(4-t-butylcyclohexyl) peroxy dicarbonate (manufactured by NOF Corp., trade name: Perloyl TCP, 10 hours half-life temperature=41° C.) and 1.6 parts of dicumyl peroxide (manufactured by NOF Corp., trade name: Percumyl D, 10 hours half-life temperature=116° C.) were used as a curing agent, and other composition was as shown in Table 9. The evaluation results are shown in Table 10.

EXAMPLE I-8

To 100 parts of a (meth)acrylic resin composition composed of 50% of methyl methacrylate, 15% of 1,3-butylene glycol dimethacrylate and 35% of the polymethyl methacrylate (B-1) obtained in Production Example (9) was added 2.8 parts of 1,1-bis(t-butyl peroxy)3,3,5-trimethylcyclohexane as a curing agent and 0.5 parts of zinc stearate as an internal releasing agent, then, to this mixture was added as an inorganic filler 160 parts of aluminum hydroxide and 70 parts of the black and white inorganic filler-containing resin particles in total obtained in the above-described Production Example (11), and further was added 15 parts of the polymer powder (P-1) obtained in the above-described Production Example (1), and the resulting mixture was kneaded by a kneader for 10 minutes to obtain a (meth)acrylic BMC. The resulted (meth)acrylic BMC had no stickiness even directly after kneading and manifested extremely excellent handling property.

Then, granite-like (meth)acrylic artificial marble having form shown in FIG. 1 was obtained in the same manner as in Example I-1. The evaluation results are shown in Table 10.

EXAMPLE I-9

(Meth)acrylic artificial marble was obtained in the same manner as in Example I-8 except that composition was as shown in Table 9. The evaluation results are shown in Table 10.

COMPARATIVE EXAMPLES 10

Granite-like (meth)acrylic artificial marble having form shown in FIG. 1 was obtained in the same manner as in Example I-8 except that 2.8 parts of t-butyl peroxy benzoate was used as a curing agent and other composition was as shown in Table 9. The evaluation results are shown in Table 10.

COMPARATIVE EXAMPLE 11

To 100 parts of a (meth)acrylic resin composition composed of 20% of methyl methacrylate, 15% of styrene, 25% of trimethylolpropane trimethacrylate (manufactured by Mitsubishi Rayon Co., Ltd., trade name: Acryester TMP) and 40% of the polymethyl methacrylate (B-1) obtained in Production Example (9) was added 0.5 parts of t-butyl peroxy 2-ethyl hexanoate as a curing agent and 0.5 parts of zinc stearate as an internal releasing agent, then, to this mixture was added 220 parts of aluminum hydroxide as an inorganic filler and 100 parts of the black and white inorganic filler-containing resin particles in total obtained in the above-described Production Example (11), and the resulting mixture was kneaded by a kneader for 10 minutes to obtain a (meth)acrylic BMC.

Then, granite-like (meth)acrylic artificial marble having form shown in FIG. 1 was obtained in the same manner as in Example I-1. The evaluation results are shown in Table 10.

EXAMPLE II-1

A (Meth)acrylic BMC was obtained in the same manner as in Example I-1 except that 2.8 parts of t-butyl peroxy 3,3,5-trimethyl hexanoate (manufactured by Kayaku Akuzo Corp., trade name: Trigonox 42, 10 hours half-life temperature=100° C.) in which $R^{13}$ represents methyl group having one carbon atom in the general formula (II) was used as a curing agent, and other composition was as shown in Table 11. The resulted (meth)acrylic BMC had no stickiness even directly after kneading and manifested extremely excellent handling property.

Then, (meth)acrylic artificial marble having form shown in FIG. 1 was obtained in the same manner as in Example I-1 using this (meth)acrylic BMC. The surface of the resulted article had extremely high gloss, exhibited mirror-like appearance having no defect, and the surface smoothness was extremely high. No dimple and whitening were recognized at all at the insert screw and the thickness varied parts, and the appearance was extremely excellent. The linear shrinkage coefficient of the resulted article was as low as 0.80%, and hot water resistance of the molded article was also excellent. The evaluation results are shown in Table 12.

EXAMPLES II-2 TO II-7

(Meth)acrylic artificial marble having form shown in FIG. 1 was obtained in the same manner as in Example I-1 except that t-amyl peroxy 3,3,5-trimethylhexanoate (manufactured by Kayaku Akuzo Corp., trade name: Kayaester AN, 10 hours half-life temperature=95° C.) in which $R^{13}$ represents ethyl group having 2 carbon atoms in the general formula (II) was used as a curing agent, and other composition was as shown in Table 11. The evaluation results are shown in Table 12.

COMPARATIVE EXAMPLE 12

(Meth)acrylic artificial marble was obtained in the same manner as in Example I-1 except that 2.8 parts of t-butyl peroxy benzoate (manufactured by NOF Corp., Perbutyl Z, 10 hours half-life temperature=104° C.) in which $R^{20}$ represents methyl group having one carbon atom in the general formula (VI) was used as a curing agent, and other composition was as shown in Table 11. The evaluation results are shown in Table 12.

EXAMPLES II-8 TO II-9

Granite-like (meth)acrylic artificial marble having form shown in FIG. 1 was obtained in the same manner as in Example I-8 except that 2.8 parts of t-amyl peroxy 3,3,5-trimethylhexanoate was used as a curing agent, and other composition was as shown in Table 11. The evaluation results are shown in Table 12.

COMPARATIVE EXAMPLE 13

(Meth)acrylic artificial marble having form shown in FIG. 1 was obtained in the same manner as in Example I-8 except that 2.8 parts of t-butyl peroxy benzoate (manufactured by NOF Corp., Perbutyl Z, 10 hours half-life temperature=104° C.) in which $R^{20}$ represents methyl group having one carbon atom in the general formula (VI) was used as a curing agent, and other composition was as shown in Table 11. The evaluation results are shown in Table 12.

EXAMPLE III-1

(Meth)acrylic artificial marble was obtained in the same manner as in Example I-1 except that 2.7 parts of 1,1-bis (t-butyl peroxy)cyclododecane (manufactured by NOF Corp., trade name: Perhexa CD, 10 hours half-life temperature=95° C.) in which $R^{14}$ and $R^{15}$ represent t-butyl group in the general formula (III) was used as a curing agent, and other composition was as shown in Table 13. The resulted (meth)acrylic BMC had no stickiness even directly after kneading and manifested extremely excellent handling property.

Figure 2:
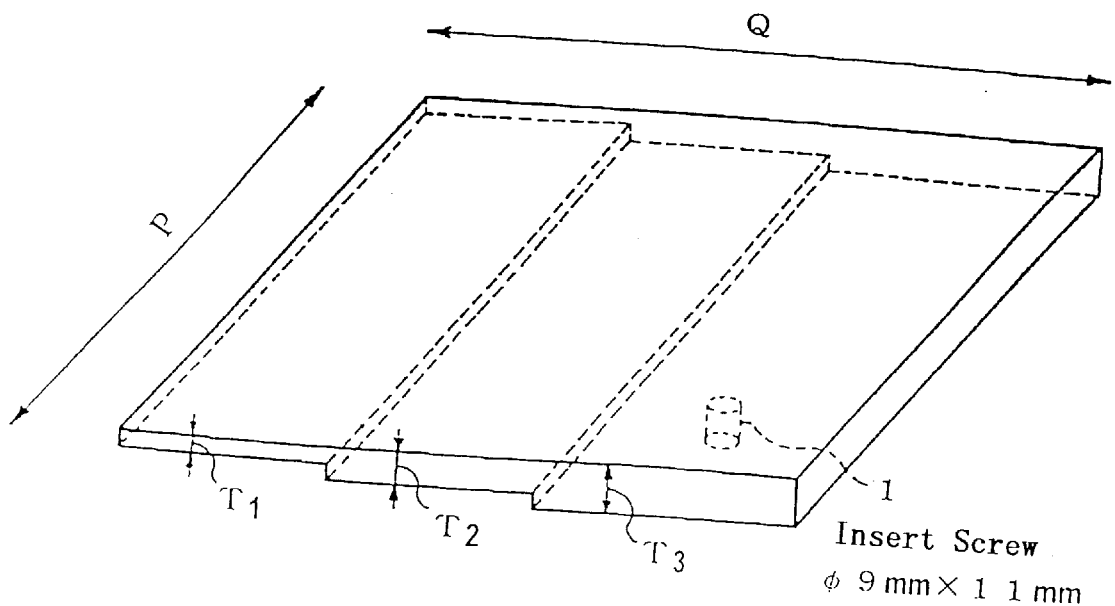
FIG. 2 is a schematic view showing the form of the (meth)acrylic artificial marble obtained in Examples III to VII.

Then, the resulted (meth)acrylic BMC was filled in a mold for molding, and cured with being heated and pressurized at a upper mold temperature of 125° C., a lower mold temperature of 110° C. and a pressure of 100 kg/cm² for 10 minutes, to obtain a molded article made from (meth)acrylic artificial marble in the form of a plate of 200 mm square having variation in thickness into which an insert screw 1 having a diameter of 9 mm and a length of 11 mm had been inserted. The form of the resulted molded article is shown in FIG. 2 (width P=200 mm, length Q=200 mm, thickness $T_1=5$ mm, thickness $T_2=10$ mm, thickness $T_3=15$ mm). The surface of the resulted article had extremely high gloss, exhibited mirror-like appearance having no defect, and the surface smoothness was extremely high. No dimple and whitening were recognized at all at the insert screw and the thickness varied parts, and the appearance was extremely excellent. The linear shrinkage coefficient of the resulted article was as low as 0.75%, and hot water resistance of the molded article was also excellent. The evaluation results are shown in Table 14.

EXAMPLES III-2 TO III-6

(Meth)acrylic artificial marble having form shown in FIG. 2 was obtained in the same manner as in Example III-1 except that composition was as shown in Table 13. The evaluation results are shown in Table 14.

COMPARATIVE EXAMPLES 14 TO 17

(Meth)acrylic BMC was prepared in the same manner as in Comparative Examples 6 to 9, then, (meth)acrylic artificial marble having form shown in FIG. 2 was obtained in the same manner as in Example III-1 The evaluation results are shown in Table 14.

EXAMPLES III-7 TO III-8

A (meth)acrylic BMC was obtained in the same manner as in Example I-8 except that 2.7 parts of 1,1-bis(t-butyl peroxy)cyclododecane was used as a curing agent and other composition was as shown in Table 13.

Then, granite-like (meth)acrylic artificial marble having form shown in FIG. 2 was obtained in the same manner as in Example III-1 using this (meth)acrylic BMC. The evaluation results are shown in Table 14.

EXAMPLES III-9

Granite-like (meth)acrylic artificial marble having form shown in FIG. 2 was obtained in the same manner as in Example III-7 except that composition was as shown in Table 13. The evaluation results are shown in Table 14.

COMPARATIVE EXAMPLES 18

A (meth)acrylic BMC was prepared in the same manner as in Comparative Example 13, then, (meth)acrylic artificial marble having form shown in FIG. 2 was obtained in the same manner as in Example III-1. The evaluation results are shown in Table 14.

COMPARATIVE EXAMPLES 19

A (meth)acrylic BMC was prepared in the same manner as in Comparative Example 11, then, (meth)acrylic artificial marble having form shown in FIG. 2 was obtained in the same manner as in Example III-1. The evaluation results are shown in Table 14.

EXAMPLE IV-1

A (meth)acrylic BMC was obtained in the same manner as in Example 1-1 except that 1.4 parts of t-butyl peroxyisopropyl carbonate (manufactured by NOF Corp., trade name: Perbutyl I, 10 hours half-life temperature=99° C.) in which $R^{16}$ represents methyl group having one carbon atom in the general formula (IV) was used as a curing agent, and other composition was as shown in Table 15. The resulted (meth) acrylic BMC had no stickiness even directly after kneading and manifested extremely excellent handling property.

Then, (meth)acrylic artificial marble having form shown in FIG. 2 was obtained in the same manner as in Example III-1 using the resulted (meth)acrylic BMC. The surface of the resulted article had extremely high gloss, exhibited mirror-like appearance having no defect, and the surface smoothness was extremely high. No dimple and whitening were recognized at all at the insert screw and the thickness varied parts, and the appearance was extremely excellent. The linear shrinkage coefficient of the resulted article was as low as 0.70%, and weatherability of the molded article was also excellent. The evaluation results are shown in Table 16.

EXAMPLE IV-2

(Meth)acrylic artificial marble having form shown in FIG. 2 was obtained in the same manner as in Example IV-1 except that 1.7 parts of t-hexyl peroxy isopropyl carbonate (manufactured by NOF Corp., Perhexyl I, 10 hours half-life temperature=95° C.) in which $R^{16}$ represents a n-propyl group having 3 carbon atoms in the general formula (IV) was used as a curing agent, and other composition was as shown in Table 15. The evaluation results are shown in Table 16.

EXAMPLES IV-3 TO IV-8

(Meth)acrylic artificial marble having form shown in FIG. 2 was obtained in the same manner as in Example IV-1 except that composition was as shown in Table 15. The evaluation results are shown in Table 16.

EXAMPLES IV-9 TO IV-11

A (meth)acrylic BMC was obtained in the same manner as in Example I-8 except that 1.4 parts of t-butyl peroxy isopropyl carbonate was used as a curing agent and composition was as shown in Table 15.

Then, granite-like (meth)acrylic artificial marble having form shown in FIG. 2 was obtained in the same manner as in Example III-1 using this (meth)acrylic BMC. The evaluation results are shown in Table 16.

EXAMPLES IV-12

Granite-like (meth)acrylic artificial marble having form shown in FIG. 2 was obtained in the same manner as in Example IV-9 except that composition was as shown in Table 15. The evaluation results are shown in Table 16.

EXAMPLE V-1

A (meth)acrylic BMC was obtained in the same manner as in Example I-1 except that 3.8 parts of 1,6-bis(t-butyl peroxycarbornyloxy)hexane (manufactured by Kayaku Akuzo Corp., trade name: Kayarene 6-70, 10 hours half-life temperature=97° C.) in which $R^{17}$ and $R^{19}$ represent methyl group having one carbon atom and $R^{18}$ represents hexylene group having 6 carbon atoms in the general formula (V) was used as a curing agent, and other composition was as shown in Table 17. The resulted (meth)acrylic BMC had no stickiness even directly after kneading and manifested extremely excellent handling property.

Then, (meth)acrylic artificial marble having form shown in FIG. 2 was obtained in the same manner as in Example III-1 using the resulted (meth)acrylic BMC. The surface of the resulted article had extremely high gloss, exhibited mirror-like appearance having no defect, and the surface smoothness was extremely high. No dimple and whitening were recognized at all at the insert screw and the thickness varied parts, and the appearance was extremely excellent.

The linear shrinkage coefficient of the resulted article was as low as 0.79%. The evaluation results are shown in Table 18.

EXAMPLES V-2 TO V-8

(Meth)acrylic artificial marble having form shown in FIG. 2 was obtained in the same manner as in Example V-1 except that composition was as shown in Table 17. The evaluation results are shown in Table 18.

EXAMPLES V-9 TO V-11

A (meth)acrylic BMC was obtained in the same manner as in Example I-8 except that 3.8 parts of 1,6-bis(t-butyl peroxycarbornyloxy)hexane was used as a curing agent and composition was as shown in Table 17.

Then, granite-like (meth)acrylic artificial marble having form shown in FIG. 2 was obtained in the same manner as in Example III-1 using this (meth)acrylic BMC. The evaluation results are shown in Table 18.

EXAMPLES V-12

(Meth)acrylic artificial marble having form shown in FIG. 2 was obtained in the same manner as in Example V-9 except that composition was as shown in Table 17. The evaluation results are shown in Table 18.

EXAMPLES VI-1 TO VI-10

A (meth)acrylic BMC was obtained in the same manner as in Example I-1 except that 1.8 parts of t-amyl peroxy benzoate (manufactured by Kayaku Akuzo Corp., trade name: KD-1, 10 hours half-life temperature=100° C.) in which $R^{20}$ represents ethyl group having 2 carbon atoms in the general formula (VI) or t-hexyl peroxy benzoate (manufactured by NOF Corp., trade name: Perhexyl Z, 10 hours half-life temperature=99° C.) in which $R^{20}$ represents n-propyl group having 3 carbon atoms in the general formula (VI) was used as a curing agent, and other composition was as shown in Table 19. The resulted (meth)acrylic BMC had no stickiness even directly after kneading and manifested extremely excellent handling property.

Then, (meth)acrylic artificial marble having form shown in FIG. 2 was obtained in the same manner as in Example III-1 using the resulted (meth)acrylic BMC. The surface of the resulted article had extremely high gloss, exhibited mirror-like appearance having no defect, and the surface smoothness was extremely high. No dimple and whitening were recognized at all at the insert screw and the thickness varied parts, and the appearance was extremely excellent. The linear shrinkage coefficient of the resulted article was as low as 0.75%. The evaluation results are shown in Table 20.

COMPARATIVE EXAMPLES 20

(Meth)acrylic artificial marble having form shown in FIG. 2 was obtained in the same manner as in Example VI-1 except that 1.8 parts of t-butyl peroxy benzoate (manufactured by NOF Corp., trade name: Perbutyl Z, 10 hours half-life temperature=104° C.) in which $R^{20}$ represents a methyl group having one carbon atom in the general formula (VI) was used as a curing agent, and other composition was as shown in Table 19. The evaluation results are shown in Table 20.

EXAMPLES VI-11 TO V-21

A (meth)acrylic BMC was obtained in the same manner as in Example I-8 except that composition was as shown in Table 21.

Then, granite-like (meth)acrylic artificial marble having form shown in FIG. 2 was obtained in the same manner as in Example VI-1 using this (meth)acrylic BMC. The evaluation results are shown in Table 22.

COMPARATIVE EXAMPLES 21

(Meth)acrylic artificial marble having form shown in FIG. 2 was obtained in the same manner as in Example VI-11 except that 1.8 parts of t-butyl peroxy benzoate (manufactured by NOF Corp., trade name: Perbutyl Z, 10 hours half-life temperature=104° C.) in which $R^{20}$ represents methyl group having one carbon atom in the general formula (VI) was used as a curing agent, and other composition was as shown in Table 21. The evaluation results are shown in Table 22.

EXAMPLES VII-1 TO VII-6

A (meth)acrylic BMC was obtained in the same manner as in Example I-1 except that 2.8 parts of n-butyl-4,4-bis(t-butyl peroxy) valerate (manufactured by NOF Corp., trade name: Perhexa V, 10 hours half-life temperature=105° C.) in which $R^{21}$ represents methyl group having one carbon atom, $R^{22}$ represents ethylene group having 2 carbon atoms and $R^{23}$ represents n-butyl group having 4 carbon atoms in the general formula (VII) was used as a curing agent, and other composition was as shown in Table 23. The resulted (meth)acrylic BMC had no stickiness even directly after kneading and manifested extremely excellent handling property.

Then, (meth)acrylic artificial marble having form shown in FIG. 2 was obtained in the same manner as in Example III-1 using the resulted (meth)acrylic BMC. The surface of the resulted article had extremely high gloss, exhibited mirror-like appearance having no defect, and the surface smoothness was extremely high. No dimple and whitening were recognized at all at the insert screw and the thickness varied parts, and the appearance was extremely excellent. These evaluation results are shown in Table 24.

COMPARATIVE EXAMPLE 22

To 100 parts of a (meth)acrylic resin composition composed of 33% of cyclohexyl methacrylate, 33% of sec-butyl methacrylate and 34% of the polycyclohexyl methacrylate (B-2) obtained in the above-described Production Example (10) was added 3.0 parts of benzoyl peroxide (manufactured by Kayaku Akuzo Corp. trade name: Kadox B-CH 50, 10 hours half-life temperature=72° C.) as a curing agent and 0.5 parts of zinc stearate as an internal releasing agent, then, to this mixture was added 200 parts of aluminum hydroxide as an inorganic filler, and the resulting mixture was kneaded by a kneader for 10 minutes to obtain a (meth)acrylic premix. Then, this (meth)acrylic premix was aged at room temperature for 24 hours or more, however, it was not thickened.

This (meth)acrylic premix was filled in a mold for molding, and (meth)acrylic artificial marble having form shown in FIG. 2 was molded in the same manner as in Example III-1. The evaluation results are shown in Table 24.

COMPARATIVE EXAMPLE 23

To 100 parts of a (meth)acrylic resin composition composed of 70% of tricyclo[$5.2.1.0^{2,6}$]decanyl (meth)acrylate, 20% of styrene and 10% of ethylene glycol dimethacrylate was added 2.8 parts of benzoyl peroxide (manufactured by Kayaku Akuzo Corp. trade name: Kadox B-CH 50, 10 hours half-life temperature=72° C.) as a curing agent and 0.5 parts of zinc stearate as an internal releasing agent, then, to this mixture was added 200 parts of aluminum hydroxide as an inorganic filler, and the resulting mixture was kneaded by a kneader for 10 minutes to obtain a (meth)acrylic premix. Then, this (meth)acrylic premix was aged at room temperature for 24 hours or more, however, it was not thickened.

This (meth)acrylic premix was filled in a mold for molding, and (meth)acrylic artificial marble having form shown in FIG. 2 was molded in the same manner as in Example III-1. The evaluation results are shown in Table 24.

EXAMPLES VII-7 TO VII-15

A (meth)acrylic BMC was obtained in the same manner as in Example I-8 except that composition was as shown in Table 25.

Then, granite-like (meth)acrylic artificial marble having form shown in FIG. 2 was obtained in the same manner as in Example VII-1 using this (meth)acrylic BMC. The evaluation results are shown in Table 26.

COMPARATIVE EXAMPLES 24

(Meth)acrylic artificial marble having form shown in FIG. 2 was obtained in the same manner as in Example VII-7 except that 2.8 parts of t-butyl peroxy benzoate in which $R^{20}$ represents methyl group having one carbon atom in the general formula (VI) was used as a curing agent, and other composition was as shown in Table 25. The evaluation results are shown in Table 26.

TABLE 4

| | | (meth)acrylic resin composition | | | | | inorganic filler amount added (part) | inorganic filler-containing resin particle amount added (part) | polymer powder | | curing agent | |
|---|---|---|---|---|---|---|---|---|---|---|---|---|
| | | composition (% by weight) | | | | | | | amount added | | | amount added |
| | | CHMA | MMA | NPGDMA | EDMA | ST | B-1 | (part) | (part) | (part) | kind | (part) | kind | (part) |
| Ex. | a1-1 | 25 | 23 | 25 | 2 | — | 25 | 100 | 195 | — | P-1 | 25 | Perhexa 3M | 2.0 |
| | a1-2 | 19 | 29 | 25 | 2 | — | 25 | 100 | 195 | — | P-1 | 25 | Perhexa 3M | 2.0 |
| | a1-3 | 13 | 35 | 25 | 2 | — | 25 | 100 | 195 | — | P-1 | 25 | Perhexa 3M | 2.0 |
| | a1-4 | 25 | 23 | 25 | 2 | — | 25 | 100 | 195 | — | P-2 | 25 | Perhexa 3M | 2.0 |
| | a1-5 | 25 | 23 | 25 | 2 | — | 25 | 100 | 195 | — | P-3 | 25 | Perhexa 3M | 2.0 |
| | a1-6 | 24 | 24 | 15 | 2 | — | 35 | 100 | 170 | 70 | P-1 | 25 | Perhexa 3M | 2.0 |
| Comp. Ex. | 1 | — | 48 | 25 | 2 | — | 25 | 100 | 195 | — | P-1 | 25 | Perbutyl Z | 2.0 |
| | 2 | — | 23 | 25 | 2 | 25 | 25 | 100 | 195 | — | P-1 | 25 | Perbutyl Z | 2.0 |
| | 3 | 40 | 32 | — | 5 | — | 23 | 100 | 900 | — | — | — | V-65 | 10 |

| | | internal releasing agent amount added (part) | thickening property of BMC | deep feeling of molded article (transparency) | unevenness in gloss of molded article | hot water resistance of molded article |
|---|---|---|---|---|---|---|
| Ex. | a1-1 | 0.5 | A | ○ | ◉ | ◉ |
| | a1-2 | 0.5 | A | ○ | ○+ | ◉ |
| | a1-3 | 0.5 | A | ○ | ○ | ○+ |
| | a1-4 | 0.5 | A | ○ | ◉ | ◉ |
| | a1-5 | 0.5 | B | ○ | ◉ | ◉ |
| | a1-6 | 0.5 | A | ○ | ◉ | ◉ |
| Comp. Ex. | 1 | 0.5 | A | ○ | Δ | X |
| | 2 | 0.5 | A | Δ | X | X |
| | 3 | 2.0 | C | X | ◉ | ◉ |

CHMA: cyclohexyl methacrylate
MMA: methyl methacrylate
NPGDMA: neopentyl glycol dimethacrylate
EDMA: ethylene glycol dimethacrylate
ST: styrene
Perhexa 3M: 1,1-bis(t-butyl peroxy)3,3,5-trimethylcyclohexane
Perbutyl Z: t-butyl peroxy benzoate
V-65: 2,2'-azobis(2,4-dimethylvaleronitrile)

TABLE 5

| | | (meth)acrylic resin composition | | | | | | | inorganic filler | inorganic filler-containing resin particle | polymer powder | | curing agent | |
|---|---|---|---|---|---|---|---|---|---|---|---|---|---|---|
| | | composition (% by weight) | | | | | | | amount added (part) | amount added (part) | amount added (part) | | | amount added (part) |
| | | IBXMA | IBXA | MMA | NPGDMA | EDM | ST | B-1 | | | kind | (part) | kind | |
| Ex. | a2-1 | 25 | — | 23 | 25 | 2 | — | 25 | 100 | 195 | — | P-1 | 25 | Perhexa 3M | 2.0 |
| | a2-2 | 19 | — | 29 | 25 | 2 | — | 25 | 100 | 195 | — | P-1 | 25 | Perhexa 3M | 2.0 |
| | a2-3 | 15 | — | 33 | 25 | 2 | — | 25 | 100 | 195 | — | P-1 | 25 | Perhexa 3M | 2.0 |
| | a2-4 | 9 | — | 39 | 25 | 2 | — | 25 | 100 | 195 | — | P-1 | 25 | Perhexa 3M | 2.0 |
| | a2-5 | 25 | — | 23 | 25 | 2 | — | 25 | 100 | 195 | — | P-2 | 25 | Perhexa 3M | 2.0 |
| | a2-6 | 25 | — | 23 | 25 | 2 | — | 25 | 100 | 195 | — | P-3 | 25 | Perhexa 3M | 2.0 |
| | a2-7 | — | 25 | 23 | 25 | 2 | — | 25 | 100 | 195 | — | P-1 | 25 | Perhexa 3M | 2.0 |
| | a2-8 | 24 | — | 24 | 15 | 2 | — | 35 | 100 | 170 | 70 | P-1 | 25 | Perhexa 3M | 2.0 |
| Comp. Ex. | 1 | — | — | 48 | 25 | 2 | — | 25 | 100 | 195 | — | P-1 | 25 | Perbutyl Z | 2.0 |
| | 2 | — | — | 23 | 25 | 2 | 25 | 25 | 100 | 195 | — | P-1 | 25 | Perbutyl Z | 2.0 |
| | 4 | 40 | — | 32 | — | 5 | — | 23 | 100 | 900 | — | — | — | V-65 | 10 |
| | 5 | — | 40 | 32 | — | 5 | — | 23 | 100 | 900 | — | — | — | V-65 | 10 |

| | | internal releasing agent amount added (part) | thickening property of BMC | deep feeling of molded article transparency | unevenness in gloss of molded article | hot water resistance of molded article | linear shrinkage coefficient (%) |
|---|---|---|---|---|---|---|---|
| Ex. | a2-1 | 0.5 | A | ○ | ◎ | ◎ | 0.78 |
| | a2-2 | 0.5 | A | ○ | ◎ | ◎ | 0.82 |
| | a2-3 | 0.5 | A | ○ | ◎ | ◎ | 0.83 |
| | a2-4 | 0.5 | A | ○ | ○ | ○+ | 0.84 |
| | a2-5 | 0.5 | A | ○ | ◎ | ◎ | 0.78 |
| | a2-6 | 0.5 | B | ○ | ◎ | ◎ | 0.78 |
| | a2-7 | 0.5 | A | ○ | ◎ | ◎ | 0.79 |
| | a2-8 | 0.5 | A | ○ | ◎ | ◎ | 0.76 |
| Comp. Ex. | 1 | 0.5 | A | ○ | Δ | ○ | 0.93 |
| | 2 | 0.5 | A | Δ | X | ○ | 0.91 |
| | 4 | 2.0 | C | X | ◎ | ◎ | 0.20 |
| | 5 | 2.0 | C | X | ◎ | ◎ | 0.21 |

IBXMA: isobornyl methacrylate
IBXA: isobornyl acrylate
MMA: methyl methacrylate
NPGDMA: neopentyl glycol dimethacrylate
EDMA: ethylene glycol dimethacrylate
ST: styrene
Perhexa 3M: 1,1-bis(t-butyl peroxy)3,3,5-trimethylcyclohexane
Perbutyl Z: t-butyl peroxy benzoate
V-65: 2,2'-azobis(2,4-dimethylvaleronitrile)

TABLE 6

| | | (meth)acrylic resin composition | | | | | | inorganic filler | inorganic filler-containing resin particle | polymer powder | | curing agent | | internal releasing agent |
|---|---|---|---|---|---|---|---|---|---|---|---|---|---|---|
| | | composition (% by weight) | | | | | | amount added (part) | amount added (part) | amount added (part) | | | amount added (part) | amount added (part) |
| | | 513M | 513A | MMA | NPGDMA | EDM | B-1 | | | kind | (part) | kind | | |
| Ex. | a3-1 | 25 | — | 23 | 25 | 2 | 25 | 100 | 195 | — | P-1 | 25 | Perhexa 3M | 2.0 | 0.5 |
| | a3-2 | 19 | — | 29 | 25 | 2 | 25 | 100 | 195 | — | P-1 | 25 | Perhexa 3M | 2.0 | 0.5 |
| | a3-3 | 15 | — | 33 | 25 | 2 | 25 | 100 | 195 | — | P-1 | 25 | Perhexa 3M | 2.0 | 0.5 |
| | a3-4 | 9 | — | 39 | 25 | 2 | 25 | 100 | 195 | — | P-1 | 25 | Perhexa 3M | 2.0 | 0.5 |
| | a3-5 | 25 | — | 23 | 25 | 2 | 25 | 100 | 195 | — | P-2 | 25 | Perhexa 3M | 2.0 | 0.5 |
| | a3-6 | 25 | — | 23 | 15 | 2 | 35 | 100 | 195 | — | P-3 | 25 | Perhexa 3M | 2.0 | 0.5 |
| | a3-7 | — | 25 | 23 | 25 | 2 | 25 | 100 | 195 | — | P-1 | 25 | Perhexa 3M | 2.0 | 0.5 |
| | a3-8 | 24 | — | 24 | 15 | 2 | 35 | 100 | 170 | 70 | P-1 | 25 | Perhexa 3M | 2.0 | 0.5 |

TABLE 6-continued

|  |  | thickening property of BMC | of molded article transparency | in gloss of molded article | resistance of molded article | shrinkage coefficient (%) |
|---|---|---|---|---|---|---|
| Ex. | a3-1 | A | ○ | ◎ | ◎ | 0.80 |
|  | a3-2 | A | ○ | ◎ | ◎ | 0.84 |
|  | a3-3 | A | ○ | ◎ | ◎ | 0.85 |
|  | a3-4 | A | ○ | ○ | ○ | 0.86 |
|  | a3-5 | A | ○ | ◎ | ◎ | 0.80 |
|  | a3-6 | B | ○ | ◎ | ◎ | 0.80 |
|  | a3-7 | A | ○ | ◎ | ◎ | 0.85 |
|  | a3-8 | A | ○ | ◎ | ◎ | 0.78 |

513M: tricyclo[5·2·1·0$^{2,6}$] decanyl methacrylate
513A: tricyclo[5·2·1·0$^{2,6}$] decanyl acrylate
MMA: methyl methacrylate
NPGDM: neopentyl glycol dimethacrylate
EDMA: ethylene glycol dimethacrylate
ST: styrene
Perhexa 3M: 1,1-bis(t-butyl peroxy)3,3,5-trimethylcyclohexane

TABLE 7

|  |  | (meth)acrylic resin composition | | | | | | inorganic filler | inorganic filler-containing resin particle | polymer powder | | curing agent | | internal releasing agent |
|---|---|---|---|---|---|---|---|---|---|---|---|---|---|---|
|  |  | composition (% by weight) | | | | | | amount added | amount added | amount added | | | amount added | amount added |
|  |  | 3FE | MMA | NPGDMA | EDMA | ST | B-1 | (part) | (part) | (part) | kind | (part) | kind | (part) | (part) |
| Ex. | a4-1 | 25 | 23 | 25 | 2 | — | 25 | 100 | 195 | — | P-1 | 25 | Perhexa 3M | 2.0 | 0.5 |
|  | a4-2 | 19 | 29 | 25 | 2 | — | 25 | 100 | 195 | — | P-1 | 25 | Perhexa 3M | 2.0 | 0.5 |
|  | a4-3 | 15 | 33 | 25 | 2 | — | 25 | 100 | 195 | — | P-1 | 25 | Perhexa 3M | 2.0 | 0.5 |
|  | a4-4 | 9 | 39 | 25 | 2 | — | 25 | 100 | 195 | — | P-1 | 25 | Perhexa 3M | 2.0 | 0.5 |
|  | a4-5 | 25 | 23 | 25 | 2 | — | 25 | 100 | 195 | — | P-2 | 25 | Perhexa 3M | 2.0 | 0.5 |
|  | a4-6 | 25 | 23 | 15 | 2 | — | 35 | 100 | 195 | — | P-3 | 25 | Perhexa 3M | 2.0 | 0.5 |
|  | a4-7 | 24 | 24 | 15 | 2 | — | 35 | 100 | 170 | 70 | P-1 | 25 | Perhexa 3M | 2.0 | 0.5 |

|  |  | thickening property of BMC | deep feeling of molded article (transparency) | unevenness in gloss of molded article | hot water resistance of molded article |
|---|---|---|---|---|---|
| Ex. | a4-1 | A | ○ | ◎ | ◎ |
|  | a4-2 | A | ○ | ◎ | ◎ |
|  | a4-3 | A | ○ | ◎ | ◎ |
|  | a4-4 | A | ○ | ○ | ○ |
|  | a4-5 | A | ○ | ◎ | ◎ |
|  | a4-6 | B | ○ | ◎ | ◎ |
|  | a4-7 | A | ○ | ◎ | ◎ |

3FE: 2,2,2-trifluoroethyl methacrylate
MMA: methyl methacrylate
NPGDMA: neopentyl glycol dimethacrylate
EDMA: ethylene glycol dimethacrylate
ST: styrene
Perhexa 3M: 1,1-bis(t-butyl peroxy)3,3,5-trimethylcyclohexane

TABLE 8

|  |  | (meth)acrylic resin composition | | | | | | inorganic filler | inorganic filler-containing resin particle | polymer powder | | curing agent | |
|---|---|---|---|---|---|---|---|---|---|---|---|---|---|
|  |  | composition (% by weight) | | | | | | amount added | amount added | amount added | | | amount added |
|  |  | THFMA | MMA | NPGDMA | EDMA | ST | B-1 | (part) | (part) | (part) | kind | (part) | kind | (part) |
| Ex. | a5-1 | 25 | 23 | 25 | 2 | — | 25 | 100 | 195 | — | P-1 | 25 | Perhexa 3M | 2.0 |

TABLE 8-continued

|   |   |   |   |   |   |   |   |   |   |   |   |   |   |   |
|---|---|---|---|---|---|---|---|---|---|---|---|---|---|---|
|   | a5-2 | 19 | 29 | 25 | 2 | — | 25 | 100 | 195 | — | P-1 | 25 | Perhexa 3M | 2.0 |
|   | a5-3 | 15 | 33 | 25 | 2 | — | 25 | 100 | 195 | — | P-1 | 25 | Perhexa 3M | 2.0 |
|   | a5-4 | 9 | 39 | 25 | 2 | — | 25 | 100 | 195 | — | P-1 | 25 | Perhexa 3M | 2.0 |
|   | a5-5 | 25 | 23 | 25 | 2 | — | 25 | 100 | 195 | — | P-2 | 25 | Perhexa 3M | 2.0 |
|   | a5-6 | 25 | 23 | 15 | 2 | — | 35 | 100 | 195 | — | P-3 | 25 | Perhexa 3M | 2.0 |
|   | a5-7 | 24 | 24 | 15 | 2 | — | 35 | 100 | 170 | 70 | P-1 | 25 | Perhexa 3M | 2.0 |
| Comp. Ex. | 1 | — | 48 | 25 | 2 | — | 25 | 100 | 195 | — | P-1 | 25 | Perbutyl Z | 2.0 |
|   | 2 | — | 23 | 25 | 2 | 25 | 25 | 100 | 195 | — | P-1 | 25 | Perbutyl Z | 2.0 |

|   |   | internal releasing agent amount added (part) | thickening property of BMC | deep feeling of molded article (transparency) | unevenness in gloss of molded article | odor |
|---|---|---|---|---|---|---|
| Ex. | a5-1 | 0.5 | A | ○ | ◎ | ◎ |
|   | 25-2 | 0.5 | A | ○ | ◎ | ◎ |
|   | a5-3 | 0.5 | A | ○ | ◎ | ◎ |
|   | a5-4 | 0.5 | A | ○ | ○ | ○ |
|   | a5-5 | 0.5 | A | ○ | ◎ | ◎ |
|   | a5-6 | 0.5 | B | ○ | ◎ | ◎ |
|   | a5-7 | 0.5 | A | ○ | ◎ | ◎ |
| Comp. Ex. | 1 | 0.5 | A | ○ | Δ | X |
|   | 2 | 0.5 | A | ○ | X | X |

THFMA: tetrahydrofurfuryl methacrylate
MMA: methyl methacrylate
NPGDMA: neonentyl glycol dimethacrylate
EDMA: ethylene glycol dimethacrylate
ST: styrene
Perhexa 3M: 1,1-bis(t-butyl peroxy)3,3,5-trimethylcyclohexane
Perbutyl Z: t-butyl peroxy benzoate

TABLE 9

| | | (meth)acrylic resin composition | | | | | | | | | inorganic filler amount added (part) | inorganic filler-containing resin particle amount added (part) |
|---|---|---|---|---|---|---|---|---|---|---|---|---|
| | | composition (% by weight) | | | | | | | | amount added (part) | | |
| | | MMA | CHMA | IBXMA | 513A | ST | EDMA | BDMA | NPGDMA | TMPTMA | B-1 | | |
| Ex. | I-1 | 55 | — | — | — | — | — | 10 | — | — | 35 | 100 | 210 | — |
|   | I-2 | 50 | — | — | — | — | — | 15 | — | — | 35 | 100 | 210 | — |
|   | I-3 | 45 | — | — | — | — | — | — | 20 | — | 35 | 100 | 210 | — |
|   | I-4 | 40 | — | — | — | — | — | — | 25 | — | 35 | 100 | 220 | — |
|   | I-5 | 25 | 25 | — | — | — | — | 15 | — | — | 35 | 100 | 210 | — |
|   | I-6 | 35 | — | — | — | — | — | — | 30 | — | 35 | 100 | 180 | — |
|   | I-7 | 25 | — | — | 25 | — | — | 15 | — | — | 35 | 100 | 210 | — |
| Comp. Ex. | 6 | 50 | — | — | — | — | 15 | — | — | — | 35 | 100 | 210 | — |
|   | 7 | 55 | — | — | — | — | — | — | — | 9 | 36 | 100 | 230 | — |
|   | 8 | 48 | — | — | — | — | — | — | 20 | — | 32 | 100 | 200 | — |
|   | 9 | 53 | — | — | — | — | — | — | — | 12 | 35 | 100 | 250 | — |
| Ex. | I-8 | 50 | — | — | — | — | — | 15 | — | — | 35 | 100 | 160 | 70 |
|   | I-9 | 25 | — | 25 | — | — | — | — | 15 | — | 35 | 100 | 160 | 70 |
| Comp. Ex. | 10 | 50 | — | — | — | — | 15 | — | — | — | 35 | 100 | 160 | 70 |
|   | 11 | 20 | — | — | — | 15 | — | — | 25 | — | 40 | 100 | 220 | 100 |

|   |   | polymer powder | | curing agent | | internal releasing agent |
|---|---|---|---|---|---|---|
|   |   | kind | amount added (part) | kind | amount added (part) | amount added |
| Ex. | I-1 | P-1 | 35 | Perhexa C | 2.1 | 0.5 |
|   | I-2 | P-1 | 35 | Perhexa 3M | 1.8 | 0.5 |
|   | I-3 | P-2 | 35 | Perhexa HC | 2.1 | 0.5 |
|   | I-4 | P-3 | 40 | Perhexa TMH | 2.7 | 0.5 |
|   | I-5 | P-1 | 35 | Perhexa 3M | 1.8 | 0.5 |
|   | I-6 | P-1 | 35 | KD-2 | 1.8 | 0.5 |

TABLE 9-continued

|  |  |  | I-7 | P-1 | 35 | Perhexa 3M | 1.8 | 0.5 |
|---|---|---|---|---|---|---|---|---|
|  | Comp. | 6 | P-1 | 35 | Perbutyl Z | 2.8 | 0.5 |
|  | Ex. | 7 | P-3 | 15 | Trigonox121-50 | 1.8 | 0.5 |
|  |  | 8 | P-7 | 10 | Perbutyl O | 0.8 | 0.5 |
|  |  | 9 | P-8 | 20 | Perhexa 22 | 12.0 | 0.5 |
|  |  |  |  |  | Peroyl TCP | 2.0 |  |
|  |  |  |  |  | Percumyl D | 1.6 |  |
|  | Ex. | I-8 | P-1 | 15 | Perhexa 3M | 2.8 | 0.5 |
|  |  | I-9 | P-1 | 15 | Perhexa 3M | 2.8 | 0.5 |
|  | Comp. | 10 | P-1 | 15 | Perbutyl Z | 2.8 | 0.5 |
|  | Ex. | 11 | — | — | Perbutyl O | 0.5 | 0.5 |

MMA: methyl methacrylate
CHMA: cyclohexyl methacrylate
IBXMA: isobornyl methacrylate
513A: tricyclo[5·2·1·0$^{2,6}$]decanyl acrylate
ST: styrene
EDMA: ethylene glycol dimethacrylate
BDMA: 1,3-butylene glycol dimethacrylate
NPGDMA: neopentyl glycol dimethacrylate
TMPTMA: trimethylolpropane trimethacrylate

TABLE 10

| | | thickening property of BMC | appearance of molded article | | | | | | | linear shrinkage coefficient of molded article (%) | hot water resistance of molded article |
|---|---|---|---|---|---|---|---|---|---|---|---|
| | | | surface smoothness | clearness of grain pattern | unevenness in grain pattern | whitening at the insert screw | dimple at the insert screw | whitening on the surface of thickness varied part | dimple on the surface of thickness varied part | | |
| Ex. | I-1 | A | ⊚ | — | — | ⊚ | ⊚ | ⊚ | ⊚ | 0.72 | ○ |
|  | I-2 | A | ⊚ | — | — | ⊚ | ⊚ | ⊚ | ⊚ | 0.71 | ○ |
|  | I-3 | A | ⊚ | — | — | ⊚ | ⊚ | ⊚ | ⊚ | 0.71 | ○ |
|  | I-4 | B | ⊚ | — | — | ⊚ | ⊚ | ⊚ | ⊚ | 0.70 | ○ |
|  | I-5 | A | ⊚ | — | — | ⊚ | ⊚ | ⊚ | ⊚ | 0.71 | ⊚ |
|  | I-6 | A | ⊚ | — | — | ⊚ | ⊚ | ⊚ | ⊚ | 0.70 | ○ |
|  | I-7 | A | ⊚ | — | — | ⊚ | ⊚ | ⊚ | ⊚ | 0.66 | ⊚ |
| Comp. | 6 | A | ⊚ | — | — | ○ | Δ | ○ | Δ | 0.90 | X |
| Ex. | 7 | B | ○ | — | — | X | X | X | X | 0.73 | Δ |
|  | 8 | B | ○ | — | — | X | X | X | X | 0.73 | ○ |
|  | 9 | B | ○ | — | — | X | X | X | X | 0.86 | X |
| Ex. | I-8 | A | ⊚ | ⊚ | ⊚ | ⊚ | ⊚ | ⊚ | ⊚ | 0.69 | ○ |
|  | I-9 | A | ⊚ | ⊚ | ⊚ | ⊚ | ⊚ | ⊚ | ⊚ | 0.57 | ⊚ |
| Comp. | 10 | A | ⊚ | ⊚ | ⊚ | ○ | Δ | ○ | Δ | 0.88 | X |
| Ex. | 11 | B | ○ | ○ | ○ | X | X | X | X | 0.71 | ○ |

TABLE 11

| | | (meth)acrylic resin composition | | | | | | | | | | amount added (part) |
|---|---|---|---|---|---|---|---|---|---|---|---|---|
| | | composition (% by weight) | | | | | | | | | | |
| | | MMA | CHMA | IBXMA | 513M | THFMA | ST | EDMA | BDMA | NPGDMA | TMPTMA | B-1 | |
| Ex. | II-1 | 55 | — | — | — | — | — | — | 10 | — | — | 35 | 100 |
|  | II-2 | 50 | — | — | — | — | — | — | 15 | — | — | 35 | 100 |
|  | II-3 | 45 | — | — | — | — | — | — | — | 20 | — | 35 | 100 |
|  | II-4 | 40 | — | — | — | — | — | — | — | 25 | — | 35 | 100 |
|  | II-5 | 25 | 25 | — | — | — | — | — | 15 | — | — | 35 | 100 |
|  | II-6 | 25 | — | 25 | — | — | — | — | 15 | — | — | 35 | 100 |
|  | II-7 | 25 | — | — | 25 | — | — | — | 15 | — | — | 35 | 100 |
| Comp. | 12 | 50 | — | — | — | — | — | 15 | — | — | — | 35 | 100 |
| Ex. | 7 | 55 | — | — | — | — | — | — | — | — | 9 | 36 | 100 |
|  | 8 | 48 | — | — | — | — | — | — | — | — | 20 | 32 | 100 |
|  | 9 | 53 | — | — | — | — | — | — | — | 12 | — | 35 | 100 |
| Ex. | II-8 | 50 | — | — | — | — | — | — | 15 | — | — | 35 | 100 |
|  | II-9 | 25 | — | 25 | — | — | — | — | 15 | — | — | 35 | 100 |
| Comp. | 13 | 50 | — | — | — | — | — | 15 | — | — | — | 35 | 100 |

TABLE 11-continued

| Ex. | 11 | 20 | — | — | — | — | 15 | — | — | — | 25 | 40 | 100 |
|---|---|---|---|---|---|---|---|---|---|---|---|---|---|

| | | | | inorganic filler | inorganic filler-containing resin particle | polymer powder | | curing agent | | internal releasing agent |
|---|---|---|---|---|---|---|---|---|---|---|
| | | | | amount added (part) | amount added (part) | kind | amount added (part) | kind | amount added (part) | amount added (part) |
| Ex. | | II-1 | | 195 | — | P-1 | 25 | Trigonox 42 | 2.8 | 0.5 |
| | | II-2 | | 195 | — | P-1 | 25 | Kayaester AN | 2.8 | 0.5 |
| | | II-3 | | 195 | — | P-2 | 25 | Kayaester AN | 2.8 | 0.5 |
| | | II-4 | | 220 | — | P-3 | 40 | Kayaester AN | 2.8 | 0.5 |
| | | II-5 | | 195 | — | P-1 | 25 | Kayaester AN | 2.8 | 0.5 |
| | | II-6 | | 195 | — | P-1 | 25 | Kayaester AN | 2.8 | 0.5 |
| | | II-7 | | 195 | — | P-1 | 25 | Kayaester AN | 2.8 | 0.5 |
| Comp. Ex. | | 12 | | 195 | — | P-1 | 25 | Perbutyl Z | 2.8 | 0.5 |
| | | 7 | | 230 | — | P-3 | 15 | Trigonox 121-50 | 1.8 | 0.5 |
| | | 8 | | 200 | — | P-7 | 10 | Perbutyl 0 | 0.8 | 0.5 |
| | | 9 | | 250 | — | P-8 | 20 | Perhexa 22 | 12.0 | 0.5 |
| | | | | | | | | Peroyl TCP | 2.0 | |
| | | | | | | | | Percumyl D | 1.6 | |
| Ex. | | II-8 | | 165 | 75 | P-1 | 25 | Kayaester AN | 2.8 | 0.5 |
| | | II-9 | | 165 | 75 | P-1 | 25 | Kayaester AN | 2.8 | 0.5 |
| Comp. Ex. | | 13 | | 165 | 75 | P-1 | 25 | Perbutyl Z | 2.8 | 0.5 |
| | | 11 | | 220 | 100 | — | — | Perbutyl 0 | 0.5 | 0.5 |

MMA : methyl methacrylate
CHMA : cyclohexyl methacrylate
IBXMA : isobornyl methacrylate
513M : tricyclo[$5\cdot2\cdot1\cdot0^{2,6}$]decanyl acrylate
THFMA : tetrahydrofurfuryl methacrylate
ST : styrene
EDMA : ethylene glycol dimethacrylate
BDMA : 1,3-butylene glycol dimethacrylate
NPGDMA : neopentyl glycol dimethacrylate
TMPTMA : trimethylolpropane trimethacrylate

TABLE 12

| | | thickening property of BMC | appearance of molded article | | | | | | | linear shrinkage coefficient of molded article (%) | weather-ability of molded article |
|---|---|---|---|---|---|---|---|---|---|---|---|
| | | | surface smooth-ness | clear-ness of grain pattern | uneven-ness in grain pattern | whitening at the insert screw | dimple at the insert screw | whitening on the surface of thickness varied part | dimple on the surface of thickness varied part | | |
| Ex. | II-1 | A | ⊚ | — | — | ⊚ | ○ | ⊚ | ○ | 0.80 | ○ |
| | II-2 | A | ⊚ | — | — | ⊚ | ⊚ | ⊚ | ⊚ | 0.76 | ○ |
| | II-3 | A | ⊚ | — | — | ⊚ | ⊚ | ⊚ | ⊚ | 0.76 | ○ |
| | II-4 | B | ⊚ | — | — | ⊚ | ⊚ | ⊚ | ⊚ | 0.76 | ○ |
| | II-5 | A | ⊚ | — | — | ⊚ | ⊚ | ⊚ | ⊚ | 0.76 | ⊚ |
| | II-6 | A | ⊚ | — | — | ⊚ | ⊚ | ⊚ | ⊚ | 0.66 | ⊚ |
| | II-7 | A | ⊚ | — | — | ⊚ | ⊚ | ⊚ | ⊚ | 0.80 | ⊚ |
| Comp. Ex. | 12 | A | ⊚ | — | — | ○ | Δ | ○ | Δ | 0.90 | X |
| | 7 | B | ○ | — | — | X | X | X | X | 0.73 | ○ |
| | 8 | B | ○ | — | — | X | X | X | X | 0.73 | ○ |
| | 9 | B | ○ | — | — | X | X | X | X | 0.86 | X |
| Ex. | II-8 | A | ⊚ | ⊚ | ⊚ | ⊚ | ⊚ | ⊚ | ⊚ | 0.74 | ○ |
| | II-9 | A | ⊚ | ⊚ | ⊚ | ⊚ | ⊚ | ⊚ | ⊚ | 0.62 | ⊚ |
| Comp. Ex. | 13 | A | ⊚ | ⊚ | ⊚ | ○ | Δ | ○ | Δ | 0.88 | X |
| | 11 | B | ○ | ○ | ○ | X | X | X | X | 0.71 | X |

TABLE 13

| | | (meth)acrylic resin composition | | | | | | | | | |
|---|---|---|---|---|---|---|---|---|---|---|---|
| | | composition (% by weight) | | | | | | | | | amount added |
| | | MMA | CHMA | IBXMA | ST | EDMA | BDMA | NPGDMA | TMPTMA | B-1 | (part) |
| Ex. | III-1 | 55 | — | — | — | — | 10 | — | — | 35 | 100 |
| | III-2 | 50 | — | — | — | — | 15 | — | — | 35 | 100 |
| | III-3 | 45 | — | — | — | — | 20 | — | — | 35 | 100 |
| | III-4 | 40 | — | — | — | — | — | 25 | — | 35 | 100 |
| | III-5 | 35 | — | — | — | — | — | 30 | — | 35 | 100 |
| | III-6 | 25 | 25 | — | — | — | — | 15 | — | 35 | 100 |
| Comp. Ex. | 14 | 50 | — | — | — | 15 | — | — | — | 35 | 100 |
| | 15 | 55 | — | — | — | — | — | — | 9 | 36 | 100 |
| | 16 | 48 | — | — | — | — | — | — | 20 | 32 | 100 |
| | 17 | 53 | — | — | — | — | 12 | — | — | 35 | 100 |
| Ex. | III-7 | 50 | — | — | — | — | 15 | — | — | 35 | 100 |
| | III-8 | 25 | — | 25 | — | — | 15 | — | — | 35 | 100 |
| | III-9 | 50 | — | — | — | — | 15 | — | — | 35 | 100 |
| Comp. Ex. | 18 | 50 | — | — | — | 15 | — | — | — | 35 | 100 |
| | 19 | 20 | — | — | 15 | — | — | — | 25 | 40 | 100 |

| | | inorganic filler | inorganic filler-containing resin particle | polymer powder | | curing agent | | internal releasing agent |
|---|---|---|---|---|---|---|---|---|
| | | amount added (part) | amount added (part) | kind | amount added (part) | kind | amount added (part) | amount added (part) |
| Ex. | III-1 | 210 | — | P-1 | 35 | Perhexa CD | 2.7 | 0.5 |
| | III-2 | 210 | — | P-2 | 35 | Perhexa CD | 2.7 | 0.5 |
| | III-3 | 210 | — | P-3 | 35 | Perhexa CD | 2.7 | 0.5 |
| | III-4 | 210 | — | P-4 | 50 | Perhexa CD | 2.7 | 0.5 |
| | III-5 | 210 | — | P-5 | 45 | Perhexa CD | 2.7 | 0.5 |
| | III-6 | 210 | — | P-2 | 35 | Perhexa CD | 2.7 | 0.5 |
| Comp. Ex. | 14 | 210 | — | P-1 | 35 | Perbutyl Z | 2.8 | 0.5 |
| | 15 | 230 | — | P-3 | 15 | Trigonox 121-50 | 1.8 | 0.5 |
| | 16 | 200 | — | P-7 | 10 | Perbutyl O | 0.8 | 0.5 |
| | 17 | 250 | — | P-8 | 20 | Perhexa 22 | 12.0 | 0.5 |
| | | | | | | Peroyl TCP | 2.0 | |
| | | | | | | Percumyl D | 1.6 | |
| Ex. | III-7 | 165 | 75 | P-1 | 25 | Perhexa CD | 2.7 | 0.5 |
| | III-8 | 165 | 75 | P-1 | 25 | Perhexa CD | 2.7 | 0.5 |
| | III-9 | 220 | 100 | — | — | Perhexa CD | 2.7 | 0.5 |
| Comp. Ex. | 18 | 165 | 75 | P-1 | 25 | Perbutyl Z | 2.8 | 0.5 |
| | 19 | 220 | 100 | — | — | Perbutyl O | 0.5 | 0.5 |

MMA : methyl methacrylate
CHMA : cyclohexyl methacrylate
IBXMA : isobornyl methacrylate
ST : styrene
EDMA : ethylene glycol dimethacrylate
BDMA : 1,3-butylene glycol dimethacrylate
NPGDMA : neopentyl glycol dimethacrylate
TMPTMA : trimethylolpropane trimethacrylate

TABLE 14

| | | thickening property of BMC | appearance of molded article | | | | | | | linear shrinkage coefficient of molded article (%) | hot water resistance of molded article |
|---|---|---|---|---|---|---|---|---|---|---|---|
| | | | surface smoothness | clearness of grain pattern | unevenness in grain pattern | whitening at the insert screw | dimple at the insert screw | whitening on the surface of thickness varied part | dimple on the surface of thickness varied part | | |
| Ex. | III-1 | A | ⊚ | — | — | ⊚ | ⊚ | ⊚ | ⊚ | 0.75 | ○ |
| | III-2 | A | ⊚ | — | — | ⊚ | ⊚ | ⊚ | ⊚ | 0.75 | ○ |
| | III-3 | B | ⊚ | — | — | ⊚ | ⊚ | ⊚ | ⊚ | 0.75 | ○ |

TABLE 14-continued

| | | thickening property of BMC | appearance of molded article | | | | | | | linear shrinkage coefficient of molded article (%) | hot water resistance of molded article |
|---|---|---|---|---|---|---|---|---|---|---|---|
| | | | surface smoothness | clearness of grain pattern | unevenness in grain pattern | whitening at the insert screw | dimple at the insert screw | whitening on the surface of thickness varied part | dimple on the surface of thickness varied part | | |
| | III-4 | B | ◎ | — | — | ○ | ◎ | ◎ | ◎ | 0.75 | ○ |
| | III-5 | B | ◎ | — | — | ○ | ◎ | ◎ | ◎ | 0.75 | ○ |
| | III-6 | A | ◎ | — | — | ◎ | ◎ | ◎ | ◎ | 0.75 | ◎ |
| Comp. | 14 | A | ◎ | — | — | ○ | Δ | ○ | Δ | 0.90 | X |
| Ex. | 15 | B | ○ | — | — | X | X | X | X | 0.73 | Δ |
| | 16 | B | ○ | — | — | X | X | X | X | 0.73 | ○ |
| | 17 | B | ○ | — | — | X | X | X | X | 0.86 | X |
| Ex. | III-7 | A | ◎ | ◎ | ◎ | ◎ | ◎ | ◎ | ◎ | 0.73 | ○ |
| | III-8 | A | ◎ | ◎ | ◎ | ◎ | ◎ | ◎ | ◎ | 0.60 | ◎ |
| | III-9 | B | ◎ | ○ | ○ | ◎ | ◎ | ◎ | ◎ | 0.73 | ○ |
| Comp. | 18 | A | ◎ | ◎ | ◎ | ○ | Δ | ○ | Δ | 0.88 | X |
| Ex. | 19 | B | ○ | ○ | ○ | X | X | X | X | 0.71 | ○ |

TABLE 15

| | | (meth)acrylic resin composition | | | | | | | | | amount added (part) |
|---|---|---|---|---|---|---|---|---|---|---|---|
| | | composition (% by weight) | | | | | | | | | |
| | | MMA | CHMA | IBXMA | 513A | 3FE | THFMA | BDMA | NPGDMA | B-1 | |
| Ex. | IV-1 | 55 | — | — | — | — | — | 10 | — | 35 | 100 |
| | IV-2 | 50 | — | — | — | — | — | 15 | — | 35 | 100 |
| | IV-3 | 45 | — | — | — | — | — | 20 | — | 35 | 100 |
| | IV-4 | 40 | — | — | — | — | — | — | 25 | 35 | 100 |
| | IV-5 | 35 | — | — | — | — | — | — | 30 | 35 | 100 |
| | IV-6 | 25 | 25 | — | — | — | — | 15 | — | 35 | 100 |
| | IV-7 | 25 | — | — | 25 | — | — | 15 | — | 35 | 100 |
| | IV-8 | 25 | — | — | — | 25 | — | 15 | — | 35 | 100 |
| | IV-9 | 50 | — | — | — | — | 15 | — | — | 35 | 100 |
| | IV-10 | 25 | — | 25 | — | — | — | 15 | — | 35 | 100 |
| | IV-11 | 25 | — | — | — | — | 25 | 15 | — | 35 | 100 |
| | IV-12 | 50 | — | — | — | — | — | 15 | — | 35 | 100 |

| | | inorganic filler amount added (part) | inorganic filler-containing resin particle amount added (part) | polymer powder | | curing agent | | internal releasing agent amount added (part) |
|---|---|---|---|---|---|---|---|---|
| | | | | kind | amount added (part) | kind | amount added (part) | |
| Ex. | IV-1 | 210 | — | P-1 | 35 | Perbutyl I | 1.4 | 0.5 |
| | IV-2 | 210 | — | P-2 | 35 | Perhexyl I | 1.7 | 0.5 |
| | IV-3 | 210 | — | P-3 | 35 | Perbutyl I | 1.4 | 0.5 |
| | IV-4 | 210 | — | P-4 | 50 | Perbutyl I | 1.4 | 0.5 |
| | IV-5 | 210 | — | P-5 | 45 | Perhexyl I | 1.7 | 0.5 |
| | IV-6 | 210 | — | P-1 | 35 | Perbutyl I | 1.4 | 0.5 |
| | IV-7 | 210 | — | P-1 | 35 | Perbutyl I | 1.4 | 0.5 |
| | IV-8 | 210 | — | P-1 | 35 | Perbutyl I | 1.4 | 0.5 |
| | IV-9 | 165 | 75 | P-1 | 25 | Perbutyl I | 1.4 | 0.5 |
| | IV-10 | 165 | 75 | P-1 | 25 | Perbutyl I | 1.4 | 0.5 |
| | IV-11 | 165 | 75 | P-1 | 25 | Perbutyl I | 1.4 | 0.5 |
| | IV-12 | 220 | 100 | — | — | Perhexyl I | 1.7 | 0.5 |

MMA : methyl methacrylate
CHMA : cyclohexyl methacrylate
IBXMA : isobornyl methacrylate
513A : tricyclo[5·2·1·0$^{2,6}$]decanyl acrylate
3FE : 2,2,2-trifluoroethyl methacrylate
THFMA : tetrahydrofurfuryl methacrylate BDMA : 1,3-butylene glycol dimethacrylate
NPGDMA : neopentyl glycol dimethacrylate

TABLE 16

| | | thickening property of BMC | surface smoothness | clearness of grain pattern | unevenness in grain pattern | whitening at the insert screw | dimple at the insert screw | whitening on the surface of thickness varied part | dimple on the surface of thickness varied part | linear shrinkage coefficient of molded article (%) | weatherability of molded article |
|---|---|---|---|---|---|---|---|---|---|---|---|
| Ex. | IV-1 | A | ⊚ | — | — | ⊚ | ⊚ | ⊚ | ⊚ | 0.70 | ○ |
| | IV-2 | A | ⊚ | — | — | ○+ | ⊚ | ○+ | ⊚ | 0.74 | ○ |
| | IV-3 | B | ⊚ | — | — | ⊚ | ⊚ | ⊚ | ⊚ | 0.70 | ○ |
| | IV-4 | B | ○ | — | — | ⊚ | ⊚ | ⊚ | ⊚ | 0.70 | ○ |
| | IV-5 | B | ○ | — | — | ○+ | ⊚ | ○+ | ⊚ | 0.74 | ○ |
| | IV-6 | A | ⊚ | — | — | ⊚ | ⊚ | ⊚ | ⊚ | 0.70 | ⊚ |
| | IV-7 | A | ⊚ | — | — | ⊚ | ⊚ | ⊚ | ⊚ | 0.65 | ⊚ |
| | IV-8 | A | ⊚ | — | — | ⊚ | ⊚ | ⊚ | ⊚ | 0.70 | ⊚ |
| | IV-9 | A | ⊚ | ⊚ | ⊚ | ⊚ | ⊚ | ⊚ | ⊚ | 0.68 | ○ |
| | IV-10 | A | ⊚ | ⊚ | ⊚ | ⊚ | ⊚ | ⊚ | ⊚ | 0.55 | ⊚ |
| | IV-11 | A | ⊚ | ⊚ | ⊚ | ⊚ | ⊚ | ⊚ | ⊚ | 0.72 | ○ |
| | IV-12 | B | ⊚ | ○ | ○ | ○+ | ⊚ | ○+ | ⊚ | 0.72 | ○ |

TABLE 17

| | | (meth)acrylic resin composition | | | | | | | | | amount added |
|---|---|---|---|---|---|---|---|---|---|---|---|
| | | composition (% by weight) | | | | | | | | | |
| | | MMA | CHMA | IBXMA | 513A | 3FE | THFMA | BDMA | NPGDMA | B-1 | (part) |
| Ex. | V-1 | 55 | — | — | — | — | — | 10 | — | 35 | 100 |
| | V-2 | 50 | — | — | — | — | — | 15 | — | 35 | 100 |
| | V-3 | 45 | — | — | — | — | — | 20 | — | 35 | 100 |
| | V-4 | 40 | — | — | — | — | — | — | 25 | 35 | 100 |
| | V-5 | 35 | — | — | — | — | — | — | 30 | 35 | 100 |
| | V-6 | 25 | 25 | — | — | — | — | 15 | — | 35 | 100 |
| | V-7 | 25 | — | — | 25 | — | — | 15 | — | 35 | 100 |
| | V-8 | 25 | — | — | — | 25 | — | 15 | — | 35 | 100 |
| | V-9 | 50 | — | — | — | — | — | 15 | — | 35 | 100 |
| | V-10 | 25 | — | 25 | — | — | — | 15 | — | 35 | 100 |
| | V-11 | 25 | — | — | — | — | 25 | 15 | — | 35 | 100 |
| | V-12 | 50 | — | — | — | — | — | 15 | — | 35 | 100 |

| | | inorganic filler amount added (part) | inorganic filler-containing resin particle amount added (part) | polymer powder | | curing agent | | internal releasing agent amount added (part) |
|---|---|---|---|---|---|---|---|---|
| | | | | kind | amount added (part) | kind | amount added (part) | |
| Ex. | V-1 | 210 | — | P-1 | 35 | Kayarene 6-70 | 3.8 | 0.5 |
| | V-2 | 210 | — | P-2 | 35 | Kayarene 6-70 | 3.8 | 0.5 |
| | V-3 | 210 | — | P-3 | 35 | Kayarene 6-70 | 3.8 | 0.5 |
| | V-4 | 210 | — | P-4 | 50 | Kayarene 6-70 | 3.8 | 0.5 |
| | V-5 | 210 | — | P-5 | 45 | Kayarene 6-70 | 3.8 | 0.5 |
| | V-6 | 210 | — | P-1 | 35 | Kayarene 6-70 | 3.8 | 0.5 |
| | V-7 | 210 | — | P-1 | 35 | Kayarene 6-70 | 3.8 | 0.5 |
| | V-8 | 210 | — | P-1 | 35 | Kayarene 6-70 | 3.8 | 0.5 |
| | V-9 | 165 | 75 | P-1 | 25 | Kayarene 6-70 | 3.8 | 0.5 |
| | V-10 | 165 | 75 | P-1 | 25 | Kayarene 6-70 | 3.8 | 0.5 |

TABLE 17-continued

|   |      |     |     |     |    |             |     |     |
|---|------|-----|-----|-----|----|-------------|-----|-----|
|   | V-11 | 165 |  75 | P-1 | 25 | Kayarene 6-70 | 3.8 | 0.5 |
|   | V-12 | 220 | 100 |  —  |  — | Kayarene 6-70 | 3.8 | 0.5 |

MMA : methyl methacrylate
CHMA : cyclohexyl methacrylate
IBXMA : isobornyl methacrylate
513A : tricyclo[$5 \cdot 2 \cdot 1 \cdot 0^{2,6}$]decanyl acrylate
3FE : 2,2,2-trifluoroethyl methacrylate
THFMA : tetrahydrofurfuryl methacrylate
BDMA : 1,3-butylene glycol dimethacrylate
NPGDMA : neopentyl glycol dimethacrylate

TABLE 18

|     |      | thickening property of BMC | appearance of molded article ||||||||| linear shrinkage coefficient of molded article (%) | weatherability of molded article |
|-----|------|---|---|---|---|---|---|---|---|---|---|
|     |      |   | surface smoothness | clearness of grain pattern | unevenness in grain pattern | whitening at the insert screw | dimple at the insert screw | whitening on the surface of thickness varied part | dimple on the surface of thickness varied part | | |
| Ex. | V-1  | A | ⊙ | — | — | ⊙ | ⊙ | ⊙ | ⊙ | 0.79 | ○ |
|     | V-2  | A | ⊙ | — | — | ⊙ | ⊙ | ⊙ | ⊙ | 0.79 | ○ |
|     | V-3  | B | ⊙ | — | — | ⊙ | ⊙ | ⊙ | ⊙ | 0.79 | ○ |
|     | V-4  | B | ○ | — | — | ⊙ | ⊙ | ⊙ | ⊙ | 0.79 | ○ |
|     | V-5  | B | ○ | — | — | ⊙ | ⊙ | ⊙ | ⊙ | 0.79 | ○ |
|     | V-6  | A | ⊙ | — | — | ⊙ | ⊙ | ⊙ | ⊙ | 0.79 | ⊙ |
|     | V-7  | A | ⊙ | — | — | ⊙ | ⊙ | ⊙ | ⊙ | 0.74 | ⊙ |
|     | V-8  | A | ⊙ | — | — | ⊙ | ⊙ | ⊙ | ⊙ | 0.79 | ⊙ |
|     | V-9  | A | ⊙ | ⊙ | ⊙ | ⊙ | ⊙ | ⊙ | ⊙ | 0.77 | ○ |
|     | V-10 | A | ⊙ | ⊙ | ⊙ | ⊙ | ⊙ | ⊙ | ⊙ | 0.65 | ⊙ |
|     | V-11 | A | ⊙ | ⊙ | ⊙ | ⊙ | ⊙ | ⊙ | ⊙ | 0.80 | ⊙ |
|     | V-12 | B | ⊙ | ○ | ○ | ⊙ | ⊙ | ⊙ | ⊙ | 0.76 | ○ |

TABLE 19

|       |       | (meth)acrylic resin composition ||||||||| amount added |
|-------|-------|---|---|---|---|---|---|---|---|---|
|       |       | composition (% by weight) ||||||||| |
|       |       | MMA | CHMA | IBXMA | 513M | 3FE | EDM | NPGDMA | B-1 | (part) |
| Ex.   | VI-1  | 48 | — | — | — | — | 2 | 25 | 25 | 100 |
|       | VI-2  | 48 | — | — | — | — | 2 | 25 | 25 | 100 |
|       | VI-3  | 48 | — | — | — | — | 2 | 25 | 25 | 100 |
|       | VI-4  | 48 | — | — | — | — | 2 | 25 | 25 | 100 |
|       | VI-5  | 48 | — | — | — | — | 2 | 25 | 25 | 100 |
|       | VI-6  | 48 | — | — | — | — | 2 | 25 | 25 | 100 |
|       | VI-7  | 24 | 24 | — | — | — | 2 | 25 | 25 | 100 |
|       | VI-8  | 24 | — | 24 | — | — | 2 | 25 | 25 | 100 |
|       | VI-9  | 24 | — | — | 24 | — | 2 | 25 | 25 | 100 |
|       | VI-10 | 24 | — | — | — | 24 | 2 | 25 | 25 | 100 |
| Comp. Ex. |   | 20 | 48 | — | — | — | 2 | 25 | 25 | 100 |

|     |      | inorganic filler | inorganic filler-containing resin particle | polymer powder || curing agent || internal releasing agent |
|-----|------|---|---|---|---|---|---|---|
|     |      | amount added (part) | amount added (part) | kind | amount added (part) | kind | amount added (part) | amount added (part) |
| Ex. | VI-1 | 220 | — | P-4 | 25 | KD-1 | 1.4 | 0.5 |

TABLE 19-continued

|  |  |  |  |  |  |  |  |  |
|---|---|---|---|---|---|---|---|---|
|  | VI-2 | 220 | — | P-1 | 25 | KD-1 | 1.8 | 0.5 |
|  | VI-3 | 220 | — | P-2 | 25 | Perhexyl Z | 1.8 | 0.5 |
|  | VI-4 | 220 | — | P-3 | 35 | Perhexyl Z | 1.8 | 0.5 |
|  | VI-5 | 220 | — | P-7 | 50 | KD-1 | 1.8 | 0.5 |
|  | VI-6 | 220 | — | P-8 | 40 | KD-1 | 1.8 | 0.5 |
|  | VI-7 | 220 | — | P-1 | 25 | KD-1 | 1.8 | 0.5 |
|  | VI-8 | 220 | — | P-1 | 25 | KD-1 | 1.8 | 0.5 |
|  | VI-9 | 220 | — | P-1 | 25 | KD-1 | 1.8 | 0.5 |
|  | VI-10 | 220 | — | P-1 | 25 | KD-1 | 1.8 | 0.5 |
| Comp. Ex. | 20 | 220 | — | P-1 | 25 | Perbutyl Z | 1.8 | 0.5 |

MMA : methyl methacrylate
CHMA : cyclohexyl methacrylate
IBXMA : isobornyl methacrylate
513M : tricyclo[$5 \cdot 2 \cdot 1 \cdot 0^{2,6}$]decanyl acrylate
3FE : 2,2,2-trifluoroethyl methacrylate
EDMA : ethylene glycol dimethacrylate
NPGDMA : neopentyl glycol dimethacrylate

TABLE 20

|  |  | thickening property of BMC | appearance of molded article | | | | | linear shrinkage coefficient of molded article (%) | weatherability of molded article |
|---|---|---|---|---|---|---|---|---|---|
|  |  |  | surface smoothness | whitening at the insert screw | dimple at the insert screw | whitening on the surface of thickness varied part | dimple on the surface of thickness varied part |  |  |
| Ex. | VI-1 | A | ⊚ | ⊚ | ⊚ | ⊚ | ⊚ | 0.75 | ○ |
|  | VI-2 | A | ⊚ | ⊚ | ⊚ | ⊚ | ⊚ | 0.75 | ○ |
|  | VI-3 | A | ⊚ | ⊚ | ⊚ | ⊚ | ⊚ | 0.74 | ○ |
|  | VI-4 | B | ○ | ⊚ | ⊚ | ⊚ | ⊚ | 0.74 | ○ |
|  | VI-5 | B | ○ | ⊚ | ⊚ | ⊚ | ⊚ | 0.75 | ○ |
|  | VI-6 | B | ○ | ⊚ | ⊚ | ⊚ | ⊚ | 0.75 | ○ |
|  | VI-7 | A | ⊚ | ⊚ | ⊚ | ⊚ | ⊚ | 0.75 | ⊚ |
|  | VI-8 | A | ⊚ | ⊚ | ⊚ | ⊚ | ⊚ | 0.62 | ⊚ |
|  | VI-9 | A | ⊚ | ⊚ | ⊚ | ⊚ | ⊚ | 0.65 | ⊚ |
|  | VI-10 | A | ⊚ | ⊚ | ⊚ | ⊚ | ⊚ | 0.75 | ⊚ |
| Comp. Ex. | 20 | A | ⊚ | ○ | Δ | ○ | Δ | 0.90 | X |

TABLE 21

|  |  | (meth)acrylic resin composition | | | | | | | inorganic filler |
|---|---|---|---|---|---|---|---|---|---|
|  |  | composition (% by weight) | | | | | | amount added | amount added |
|  |  | MMA | CHMA | IBXMA | EDMA | NPGDMA | B-1 | (part) | (part) |
| Ex. | VI-11 | 48 | — | — | 2 | 15 | 35 | 100 | 170 |
|  | VI-12 | 48 | — | — | 2 | 15 | 35 | 100 | 170 |
|  | VI-13 | 48 | — | — | 2 | 15 | 35 | 100 | 170 |
|  | VI-14 | 48 | — | — | 2 | 15 | 35 | 100 | 170 |
|  | VI-15 | 48 | — | — | 2 | 15 | 35 | 100 | 260 |
|  | VI-16 | 48 | — | — | 2 | 15 | 35 | 100 | 170 |
|  | VI-17 | 48 | — | — | 2 | 15 | 35 | 100 | 170 |
|  | VI-18 | 48 | — | — | 2 | 15 | 35 | 100 | 170 |
|  | VI-19 | 48 | — | — | 2 | 15 | 35 | 100 | 220 |
|  | VI-20 | 24 | 24 | — | 2 | 15 | 35 | 100 | 170 |
|  | VI-21 | 24 | — | 24 | 2 | 15 | 35 | 100 | 170 |
| Comp. Ex. | 21 | 48 | — | — | 2 | 15 | 35 | 100 | 170 | inorganic

TABLE 21-continued

| | | filler-containing resin particle amount added (part) | polymer powder kind | polymer powder amount added (part) | curing agent kind | curing agent amount added (part) | internal releasing agent amount added (part) |
|---|---|---|---|---|---|---|---|
| Ex. | VI-11 | 70 | P-1 | 25 | KD-1 | 1.8 | 0.5 |
| | VI-12 | 70 | P-5 | 20 | KD-1 | 1.8 | 0.5 |
| | VI-13 | 70 | P-6 | 15 | Perhexyl Z | 1.8 | 0.5 |
| | VI-14 | 70 | P-2 | 25 | Perhexyl Z | 1.8 | 0.5 |
| | VI-15 | 100 | P-1 | 20 | KD-1 | 1.8 | 0.5 |
| | VI-16 | 70 | P-3 | 35 | Perhexyl Z | 1.8 | 0.5 |
| | VI-17 | 70 | P-7 | 50 | KD-1 | 1.8 | 0.5 |
| | VI-18 | 70 | P-8 | 40 | KD-1 | 1.8 | 0.5 |
| | VI-19 | 100 | — | — | KD-1 | 1.8 | 0.5 |
| | VI-20 | 70 | P-1 | 25 | KD-1 | 1.8 | 0.5 |
| | VI-21 | 70 | P-1 | 25 | KD-1 | 1.8 | |
| Comp. Ex. | 21 | 70 | P-1 | 25 | Perbutyl Z | 1.8 | 0.5 |

MMA : methyl methacrylate
CHMA : cyclohexyl methacrylate
IBXMA : isobornyl methacrylate
EDMA : ethylene glycol dimethacrylate
NPGDMA : neopentyl glycol dimethacrylate

TABLE 22

| | | thickening property of BMC | appearance of molded article | | | | | | | linear shrinkage coefficient of molded article (%) | hot water resistance of molded article |
|---|---|---|---|---|---|---|---|---|---|---|---|
| | | | surface smoothness | clearness of grain pattern | unevenness in grain pattern | whitening at the insert screw | dimple at the insert screw | whitening on the surface of thickness varied part | dimple on the surface of thickness varied part | | |
| Ex. | VI-11 | A | ⊚ | ⊚ | ⊚ | ⊚ | ⊚ | ⊚ | ⊚ | 0.73 | ○ |
| | VI-12 | A | ⊚ | ⊚ | ⊚ | ⊚ | ⊚ | ⊚ | ⊚ | 0.73 | ○ |
| | VI-13 | A | ⊚ | ⊚ | ⊚ | ○+ | ⊚ | ○+ | ⊚ | 0.72 | ○ |
| | VI-14 | A | ⊚ | ⊚ | ⊚ | ⊚ | ⊚ | ⊚ | ⊚ | 0.72 | ○ |
| | VI-15 | A | ⊚ | ⊚ | ⊚ | ○+ | ⊚ | ○+ | ⊚ | 0.70 | ○ |
| | VI-16 | B | ○ | ○ | ○ | ○ | ⊚ | ○ | ⊚ | 0.74 | ○ |
| | VI-17 | B | ○ | ○ | ○ | ○ | ⊚ | ○ | ⊚ | 0.74 | ○ |
| | VI-18 | B | ○ | ○ | ○ | ○ | ⊚ | ○ | ⊚ | 0.74 | ○ |
| | VI-19 | B | ○ | ○ | ○ | ○ | ○ | ○ | ⊚ | 0.74 | ○ |
| | VI-20 | A | ⊚ | ⊚ | ⊚ | ⊚ | ⊚ | ⊚ | ⊚ | 0.73 | ⊚ |
| | VI-21 | A | ⊚ | ⊚ | ⊚ | ⊚ | ⊚ | ⊚ | ⊚ | 0.60 | ⊚ |
| Comp. Ex. | 21 | A | ⊚ | ⊚ | ⊚ | ○ | Δ | ○ | Δ | 0.88 | X |

TABLE 23

| | | (meth)acrylic resin composition | | | | | | | | inorganic filler |
|---|---|---|---|---|---|---|---|---|---|---|
| | | composition (% by weight) | | | | | | | amount added (part) | amount added (part) |
| | | MMA | CHMA | 513M | s-BMA | ST | EDMA | NPGDMA | B-1 | B-2 | | |
| Ex. | VII-1 | 48 | — | — | — | — | 2 | 25 | 25 | — | 100 | 220 |
| | VII-2 | 48 | — | — | — | — | 2 | 25 | 25 | — | 100 | 220 |
| | VII-3 | 48 | — | — | — | — | 2 | 25 | 25 | — | 100 | 220 |
| | VII-4 | 48 | — | — | — | — | 2 | 25 | 25 | — | 100 | 220 |
| | VII-5 | 48 | — | — | — | — | 2 | 25 | 25 | — | 100 | 220 |

TABLE 23-continued

|  |  |  |  |  |  |  |  |  |  |  |  |
|---|---|---|---|---|---|---|---|---|---|---|---|
|  | VII-6 | 48 | — | — | — | — | 2 | 25 | 25 | — | 100 | 220 |
| Comp. | 22 | — | 33 | — | 33 | — | — | — | — | 34 | 100 | 200 |
| Ex. | 23 | — | — | 70 | — | 20 | 10 | — | — | — | 100 | 200 |

|  |  | inorganic filler-containing resin particle | polymer powder |  | curing agent |  | internal releasing agent |
|---|---|---|---|---|---|---|---|
|  |  | amount added (part) | kind | amount added (part) | kind | amount added (part) | amount added (part) |
| Ex. | VII-1 | — | P-4 | 25 | Perhexa V | 2.8 | 0.5 |
|  | VII-2 | — | P-1 | 25 | Perhexa V | 2.8 | 0.5 |
|  | VII-3 | — | P-2 | 25 | Perhexa V | 2.8 | 0.5 |
|  | VII-4 | — | P-3 | 35 | Perhexa V | 2.8 | 0.5 |
|  | VII-5 | — | P-7 | 50 | Perhexa V | 2.8 | 0.5 |
|  | VII-6 | — | P-8 | 45 | Perhexa V | 2.8 | 0.5 |
| Comp. | 22 | — | — | — | Kadox B-CH50 | 3.0 | 0.5 |
| Ex. | 23 | — | — | — | Kadox B-CH50 | 2.8 | 0.5 |

MMA : methyl methacrylate
CHMA : cyclohexyl methacrylate
513M : tricyclo[5·2·1·0$^{2,6}$]decanyl acrylate
s-BMA : sec-butyl methacrylate
ST : styrene
EDMA : ethylene glycol dimethacrylate
NPGDMA : neopentyl glycol dimethacrylate

TABLE 24

|  |  | thickening property of BMC | appearance of molded article ||||| 
|---|---|---|---|---|---|---|---|
|  |  |  | surface smoothness | whitening at the insert screw | dimple at the insert screw | whitening on the surface of thickness varied part | dimple on the surface of thickness varied part |
| Ex. | VII-1 | A | ◉ | ◉ | ◉ | ◉ | ◉ |
|  | VII-2 | A | ◉ | ◉ | ◉ | ◉ | ◉ |
|  | VII-3 | A | ◉ | ◉ | ◉ | ◉ | ◉ |
|  | VII-4 | B | ○ | ◉ | ◉ | ◉ | ◉ |
|  | VII-5 | B | ○ | ◉ | ◉ | ◉ | ◉ |
|  | VII-6 | B | ○ | ◉ | ◉ | ◉ | ◉ |
| Comp. | 22 | C | X | X | X | X | X |
| Ex. | 23 | C | X | X | X | X | X |

TABLE 25

|  |  | (meth)acrylic resin composition ||||| inorganic filler | inorganic filler-containing resin particle | polymer powder || curing agent || internal releasing agent |
|---|---|---|---|---|---|---|---|---|---|---|---|---|
|  |  | composition (% by weight) |||| amount added | amount added | amount added | amount added || amount added | amount added |
|  |  | MMA | EDMA | NPGDMA | B-1 | (part) | (part) | (part) | kind | (part) | kind | (part) | (part) |
| Ex. | VI-7 | 48 | 2 | 15 | 35 | 100 | 170 | 70 | P-1 | 25 | Perhexa V | 2.8 | 0.5 |
|  | VI-8 | 48 | 2 | 15 | 35 | 100 | 170 | 70 | P-5 | 20 | Perhexa V | 2.8 | 0.5 |
|  | VI-9 | 48 | 2 | 15 | 35 | 100 | 170 | 70 | P-6 | 15 | Perhexa V | 2.8 | 0.5 |
|  | VI-10 | 48 | 2 | 15 | 35 | 100 | 170 | 70 | P-2 | 25 | Perhexa V | 2.8 | 0.5 |
|  | VI-11 | 48 | 2 | 15 | 35 | 100 | 260 | 100 | P-1 | 20 | Perhexa V | 2.8 | 0.5 |

TABLE 25-continued

| | | (meth)acrylic resin composition | | | | inorganic filler amount added | inorganic filler-containing resin particle amount added | polymer powder | | curing agent | | internal releasing agent amount added |
|---|---|---|---|---|---|---|---|---|---|---|---|---|
| | | composition (% by weight) | | | | amount added | amount added | amount added | | | amount added | amount added |
| | | MMA | EDMA | NPGDMA | B-1 | (part) | (part) | (part) | kind | (part) | kind | (part) | (part) |
| | VI-12 | 48 | 2 | 15 | 35 | 100 | 170 | 70 | P-3 | 35 | Perhexa V | 2.8 | 0.5 |
| | VI-13 | 48 | 2 | 15 | 35 | 100 | 170 | 70 | P-7 | 50 | Perhexa V | 2.8 | 0.5 |
| | VI-14 | 48 | 2 | 15 | 35 | 100 | 170 | 70 | P-8 | 40 | Perhexa V | 2.8 | 0.5 |
| | VI-15 | 48 | 2 | 15 | 35 | 100 | 220 | 100 | — | — | Perhexa V | 2.8 | 0.5 |
| Comp. Ex. | 24 | 48 | 2 | 15 | 35 | 100 | 170 | 70 | P-1 | 25 | Perbutyl | 2.8 | 0.5 |

MMA : methyl methacrylate
EDMA : ethylene glycol dimethacrylate
NPGDMA : neopentyl glycol dimethacrylate

TABLE 26

| | | | appearance of molded article | | | | | | |
|---|---|---|---|---|---|---|---|---|---|
| | | thickening property of BMC | surface smoothness | clearness of grain pattern | unevenness in grain pattern | whitening at the insert screw | dimple at the insert screw | whitening on the surface of thickness varied part | dimple on the surface of thickness varied part |
| Ex. | VII-7 | A | ◎ | ◎ | ◎ | ◎ | ◎ | ◎ | ◎ |
| | VII-8 | A | ◎ | ◎ | ◎ | ◎ | ◎ | ◎ | ◎ |
| | VII-9 | A | ◎ | ◎ | ◎ | ○+ | ◎ | ○+ | ◎ |
| | VII-10 | A | ◎ | ◎ | ◎ | ◎ | ◎ | ◎ | ◎ |
| | VII-11 | A | ◎ | ◎ | ◎ | ○+ | ◎ | ○+ | ◎ |
| | VII-12 | B | ○ | ○ | ○ | ○ | ◎ | ○ | ◎ |
| | VII-13 | B | ○ | ○ | ○ | ○ | ◎ | ○ | ◎ |
| | VII-14 | B | ○ | ○ | ○ | ○ | ◎ | ○ | ◎ |
| | VII-15 | B | ○ | ○ | ○ | ○ | ◎ | ○ | ◎ |
| Comp. Ex. | 24 | A | ◎ | ◎ | ◎ | ○ | Δ | ○ | Δ |

Marks revealing evaluation results in the tables are given according to the following criteria.

<Thickening Property of BMC>

A: A composition thickened immediately after kneading, and a BMC having no stickiness and manifesting excellent handling property was obtained.

B: A composition was aged at room temperature after kneading, and 24 hours or more was required for thickening up to necessary viscosity.

C: A composition was aged at room temperature for 24 hours or more after kneading, however, it did not thicken.

<Odor>

◎: No odor was recognized at all in producing and handling a BMC, and in molding a BMC.

○: Almost no odor was recognized in producing and handling a BMC, and in molding a BMC.

Δ: Slight odor was recognized in producing and handling a BMC, and in molding a BMC, but no problem.

X: Odor specific to a monomer was recognized in producing and handling a BMC, and in molding a BMC.

<Deepness (Transparency) of Molded Article>

○: Transparency is high, and deep feeling specific to marble is exhibited.

Δ: Transparency is low, and deep feeling specific to marble is not exhibited so much.

X: Transparency is low, and deep feeling specific to marble is not exhibited at all.

<Surface Smoothness of Molded Article>

◎: There is no pinhole at all, and surface smoothness is extremely high.

○: There is no pinhole, and surface smoothness is high.

<Unevenness in Gloss of Molded Article>

◎: There is no unevenness in gloss at all, and gloss is extremely high.

○+: There is no unevenness in gloss, and gloss is fairly high.

○: There is no unevenness in gloss, and gloss is high.

Δ: There is unevenness in gloss, and gloss is low

X: There is remarkable unevenness in gloss, and gloss is extremely low.

<Hot Water Resistance of Molded Article>

◎: Color change was extremely small.

○+: Color change was fairly small.

○: Color change was small.

X: Color change was large.

<Weatherability of Molded Article>

○: Color change was small.

X: Color change was large.

<Clearness of Grain Pattern of Molded Article>
⊚: Grain pattern is extremely clear, and design is excellent.
○: Grain pattern is clear, and design is excellent.
Δ: Grain pattern is indefinite, and design is poor.
X: Grain pattern is indefinite, and design is extremely poor.
<Unevenness in Grain Pattern of Molded Article>
⊚: There is no unevenness in pattern at all, and design is extremely excellent.
○: There is no unevenness in pattern, and design is excellent.
Δ: There is unevenness in pattern, and design is poor.
X: There is heavy unevenness in pattern, and design is extremely poor.
<Whitening at the Insert Screw>
⊚: There is no whitening at all, and the position at the insert screw is not recognized from the surface at all.
○+: There is no whitening, and the position at the insert screw is hardly recognized from the surface.
○: There is no whitening, and the position at the insert screw is recognized from the surface when carefully observed, but there is no practical problem.
X: There is heavy whitening, and the position at the insert screw is recognized from the surface at first glance.
<Dimple at the Insert Screw>
⊚: There is no dimple at all, and the position at the insert screw is not recognized from the surface at all.
○: There is no dimple, and the position at the insert screw is not recognized from the surface.
Δ: There are slight dimple, and the position at the insert screw is recognized from the surface.
X: There are heavy dimples, and the position at the insert screw is recognized from the surface at first glance.
<Whitening of Surface of Thickness Varied Part>
⊚: There is no whitening at all, and the position of thickness varies part is not recognized from the surface at all.
○+: There is no whitening, and the position of thickness varies part is hardly recognized from the surface.
○: There is no whitening, and the position of thickness varies part is recognized from the surface when carefully observed, but there is no practical problem.
X: There is heavy whitening, and the position of thickness varies part is recognized from the surface at first glance.
<Dimple on Surface of Thickness Varied Part>
⊚: There is no dimple at all, and the position of thickness varies part is not recognized from the surface at all.
○: There is no dimple, and the position of thickness varies part is not recognized from the surface.
Δ: There are slight dimples, and the position of thickness varies part is recognized from the surface.
X: There are heavy dimples, and the position of thickness varies part is recognized from the surface at first glance.

What is claimed is:

1. A (meth)acrylic premix comprising 100 parts by weight of a (meth)acrylic resin composition (A) containing a (meth)acrylic monomer (a) and a (meth)acrylic polymer (b), 1 to 500 parts by weight of an inorganic filler (B), and 0.01 to 20 parts by weight of a curing agent (C): wherein,
the component (a) contains at least one (meth)acrylate selected from the group consisting of a (meth)acrylate carrying an ester group having a bicyclo ring, a (meth)acrylate carrying an ester group having a fluorine atom and a (meth)acrylate carrying an ester group having cyclic ether structure.

2. The (meth)acrylic premix according to claim 1, wherein the component (C) contains a radical polymerization initiator having a 10 hours half-life temperature of 75° C. or more.

3. The (meth)acrylic premix according to claim 1 or 2, wherein the (meth)acrylate carrying an ester group having a bicyclo ring is isobornyl (meth)acrylate.

4. The (meth)acrylic premix according to claim 1 or 2, wherein the (meth)acrylate carrying an ester group having a fluorine atom is a (meth)acrylate carrying a fluoroalkyl group having 1 to 10 carbon atoms.

5. The (meth)acrylic premix according to claim 1 or 2, wherein the (meth)acrylate carrying an ester group having a cyclic ether structure is tetrahydrofurfuryl (meth)acrylate.

6. A (meth)acrylic premix comprising 100 parts by weight of a (meth)acrylic resin composition (A) containing a (meth)acrylic monomer (a) and a (meth)acrylic polymer (b), 1 to 500 parts by weight of an inorganic filler (B), and 0.01 to 20 parts by weight of a curing agent (C): wherein,
the component (a) contains at least one (meth)acrylate selected from the group consisting of a (meth)acrylate carrying an ester group having a cyclohexane ring and a (meth)acrylate carrying an ester group having a tricyclo ring, and the component (C) contains a radical polymerization initiator having a 10 hours half-life temperature of 75° C. or more.

7. The (meth)acrylic premix according to claim 6, wherein the (meth)acrylate carrying an ester group having a cyclohexane ring is cyclohexyl (meth)acrylate.

8. The (meth)acrylic premix according to claim 6, wherein the (meth)acrylate carrying an ester group having a tricyclo ring is tricyclo[5.2.1.0$^{2,6}$]decanyl (meth)acrylate.

9. The (meth)acrylic premix according to claim 2 or 6, wherein the radical polymerization initiator having a 10 hours half-life temperature of 75° C. or more contains an organic peroxide represented by the following general formula (I):

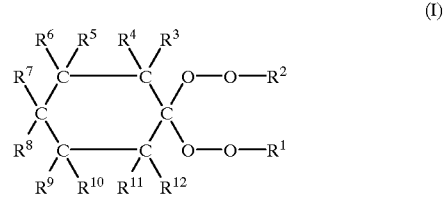

(wherein, $R^1$ and $R^2$ represent a hydrogen atom or a tert-alkyl group having 4 to 6 carbon atoms, and $R^3$ to $R^{12}$ represent a hydrogen atom or an alkyl group having 1 to 4 carbon atoms.).

10. A (meth)acrylic premix comprising 100 parts by weight of a (meth)acrylic resin composition (A) containing a (meth)acrylic monomer (a) and a (meth)acrylic polymer (b), 1 to 500 parts by weight of an inorganic filler (B), and 0.01 to 20 parts by weight of a curing agent (C): wherein,
the component (C) contains at least one organic peroxide represented by any of the following general formulae (I) to (VII):

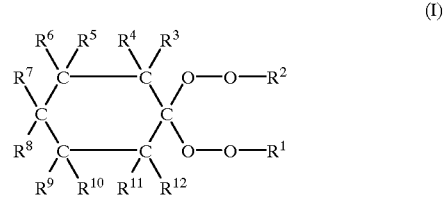

(wherein, $R^1$ and $R^2$ represent a hydrogen atom or a tert-alkyl group having 4 to 6 carbon atoms, and $R^3$ to $R^{12}$ represent a hydrogen atom or an alkyl group having 1 to 4 carbon atoms.),

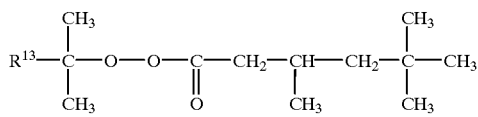
(II)

(wherein, $R^{13}$ represents an alkyl group having 1 to 5 carbon atoms.),

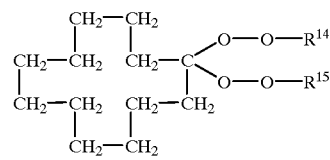
(III)

(wherein, $R^{14}$ and $R^{15}$ represent a hydrogen atom or a tert-alkyl group having 4 to 6 carbon atoms, and one or more hydrogen atoms in the cyclododecane ring may be substituted by alkyl groups having 1 to 4 carbon atoms.),

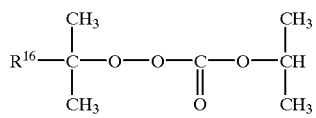
(IV)

(wherein, $R^{16}$ represents an alkyl group having 1 to 5 carbon atoms.),

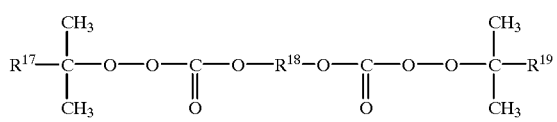
(V)

(wherein, $R^{17}$ and $R^{19}$ represent an alkyl group having 1 to 5 carbon atoms, and $R^{18}$ represents an alkylene group having 1 to 10 carbon atoms.),

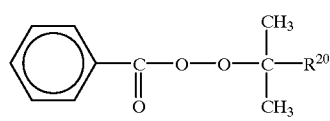
(VI)

(wherein, $R^{20}$ represents an alkyl group having 2 to 6 carbon atoms, and one or more hydrogen atoms in the benzene ring may be substituted by halogen atoms and/or alkyl groups.), and

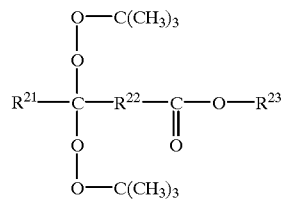
(VII)

(wherein, $R^{21}$ and $R^{23}$ represent an alkyl group having 1 to 6 carbon atoms, and $R^{22}$ represents an alkyl group having 1 to 6 carbon atoms.).

11. The (meth)acrylic premix according to claim 10, wherein the component (C) contains at least one organic peroxide represented by any of the general formulae (I) to (VI), and the component (a) contains at least one (meth) acrylate selected from the group consisting of a (meth) acrylate carrying an ester group having a bicyclo ring and a (meth)acrylate carrying an ester group having a tricyclo ring.

12. The (meth)acrylic premix according to claim 10, wherein the component (C) contains at least one organic peroxide represented by any of the general formulae (I), (III), (VI) and (VII), and the component (a) contains at least one (meth)acrylate selected from the group consisting of a (meth)acrylate carrying an ester group having a cyclohexane ring, a (meth)acrylate carrying an ester group having a bicyclo ring, a (meth)acrylate carrying an ester group having a tricyclo ring and a (meth)acrylate carrying an ester group having a fluorine atom.

13. The (meth)acrylic premix according to claim 10, wherein the component (C) contains at least one organic peroxide represented by any of the general formulae (II), (IV) and (V), and the component (a) contains at least one (meth)acrylate selected from the group consisting of a (meth)acrylate carrying an ester group having a cyclohexane ring, a (meth)acrylate carrying an ester group having a bicyclo ring, a (meth)acrylate carrying an ester group having a tricyclo ring, a (meth)acrylate carrying an ester group having a fluorine atom and a (meth)acrylate carrying an ester group having a cyclic ether structure.

14. The (meth)acrylic premix according to claim 1, 6 or 10 further comprising an inorganic filler-containing resin particle.

15. A (meth)acrylic SMC or BMC comprising the (meth) acrylic premix according to claim 1, 6 or 10 and a thickening agent.

16. The (meth)acrylic SMC or BMC according to claim 15, wherein the thickening agent is a polymer powder.

17. The (meth)acrylic SMC or BMC according to claim 16, wherein the bulk density of the polymer powder is in the range from 0.1 to 0.7 g/ml, the oil absorption in linseed oil is in the range from 60 to 200 ml/100 g, and the degree of swelling in methyl methacrylate is 16-fold or more.

18. The (meth)acrylic SMC or BMC according to claim 17, wherein the polymer powder is composed of a non-cross-linked polymer having a weight-average molecular weight of 100,000 to 2,000,000.

19. A method for producing (meth)acrylic artificial marble, wherein the (meth)acrylic SMC or BMC of claim 15 is cured with being pressurized and heated at a temperature in the range from 105 to 150° C.

* * * * *

UNITED STATES PATENT AND TRADEMARK OFFICE
CERTIFICATE OF CORRECTION

| | | |
|---|---|---|
| PATENT NO. | : 6,316,548 B1 | Page 1 of 1 |
| DATED | : November 13, 2001 | |
| INVENTOR(S) | : Koyanagi et al. | |

It is certified that error appears in the above-identified patent and that said Letters Patent is hereby corrected as shown below:

<u>Title page, Item [54], and Column 1, lines 1-3,</u>
The Title should be -- [54] (METH) ACRYLIC PREMIX, (METH) ACRYLIC SMC OR BMC, AND PROCESS FOR PRODUCING (METH) ACRYLIC ARTIFICIAL MARBLE --
Item [30], the Foreign Application Priority information should read
-- [30]           Foreign Application Priority Data
Apr. 14, 1997   (JP) ......................................... 9-095714
Jun. 17, 1997   (JP) ......................................... 9-160074
Jun. 17, 1997   (JP) ......................................... 9-160075
 Sep. 9, 1997   (JP) ......................................... 9-244132 --

Signed and Sealed this

Thirteenth Day of August, 2002

*Attest:*

*Attesting Officer*

JAMES E. ROGAN
*Director of the United States Patent and Trademark Office*